(12) United States Patent
He et al.

(10) Patent No.: US 10,901,263 B2
(45) Date of Patent: Jan. 26, 2021

(54) BACKLIGHT MODULE, DISPLAY SCREEN, AND TERMINAL

(71) Applicant: Huawei Technologies Co., Ltd., Shenzhen (CN)

(72) Inventors: Dapeng He, Dongguan (CN); Dong Chen, Shenzhen (CN); Shihong Ouyang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/857,807

(22) Filed: Apr. 24, 2020

(65) Prior Publication Data

US 2020/0249530 A1    Aug. 6, 2020

Related U.S. Application Data

(63) Continuation of application No. PCT/CN2018/093925, filed on Jun. 30, 2018.

(30) Foreign Application Priority Data

Oct. 24, 2017 (CN) .......................... 2017 1 1004743

(51) Int. Cl.
    *G02F 1/13357* (2006.01)

(52) U.S. Cl.
    CPC .. *G02F 1/133609* (2013.01); *G02F 1/133603* (2013.01); *G02F 1/133606* (2013.01); *G02F 2001/133614* (2013.01)

(58) Field of Classification Search
CPC ......... G02F 1/133609; G02F 1/133603; G02F 1/133606; G02F 1/133605; G02F 2001/133614
USPC .......................................................... 362/84
See application file for complete search history.

(56) References Cited

U.S. PATENT DOCUMENTS

| | | | |
|---|---|---|---|
| 2010/0123855 A1* | 5/2010 | Shin | F21V 9/30 349/61 |
| 2010/0244058 A1 | 9/2010 | Weng et al. | |
| 2011/0199788 A1 | 8/2011 | Park | |
| 2016/0103363 A1 | 4/2016 | Ning et al. | |

FOREIGN PATENT DOCUMENTS

| | | |
|---|---|---|
| CN | 101144582 A | 3/2008 |
| CN | 102980136 A | 3/2013 |
| CN | 103244872 A | 8/2013 |
| CN | 104110612 A | 10/2014 |

(Continued)

*Primary Examiner* — Ali Alavi
(74) *Attorney, Agent, or Firm* — Conley Rose, P.C.

(57) ABSTRACT

A display screen, a terminal, and a backlight system, where the backlight system includes a substrate, a plurality of spot light sources, an optical conversion layer, and a light mixing member, where the spot light sources are fastened onto the substrate in a mutually spaced manner. The optical conversion layer is stacked on the substrate and covers the spot light sources. The optical conversion layer is configured to convert, into a white surface light source, light emitted by the spot light sources. The light mixing member is located on a surface of the optical conversion layer or embedded into the optical conversion layer. The light mixing member is configured to mix the light. The backlight system emits light evenly and has a relatively small thickness.

20 Claims, 11 Drawing Sheets

(56) References Cited

FOREIGN PATENT DOCUMENTS

| | | | |
|---|---|---|---|
| CN | 104298001 | A | 1/2015 |
| CN | 105068314 | A | 11/2015 |
| CN | 105895787 | A | 8/2016 |
| CN | 106098906 | A | 11/2016 |
| CN | 205910483 | U | 1/2017 |
| CN | 206209253 | U | 5/2017 |
| CN | 107092129 | A | 8/2017 |
| CN | 107092130 | A | 8/2017 |
| CN | 107093659 | A | 8/2017 |
| CN | 107275462 | A | 10/2017 |
| CN | 107861291 | A | 3/2018 |
| EP | 3537208 | A1 | 9/2019 |
| KR | 20070110584 | A | 11/2007 |
| WO | 2017138679 | A1 | 8/2017 |

\* cited by examiner

BACKLIGHT MODULE, DISPLAY SCREEN, AND TERMINAL

CROSS-REFERENCE TO RELATED APPLICATION

This application is a continuation of International Patent Application No. PCT/CN2018/093925 filed on Jun. 30, 2018, which claims priority to Chinese Patent Application No. 201711004743.6 filed on Oct. 24, 2017. The disclosures of the aforementioned applications are hereby incorporated by reference in their entireties.

TECHNICAL FIELD

This application relates to the technical field of display devices, and in particular, to a backlight module, a display screen, and a terminal.

BACKGROUND

A backlight module of a display usually uses an edge-type backlight source solution or a direct-type backlight source solution.

A light source of the edge-type backlight source is arranged in a periphery of a light guide plate. Light from the light source enters the light guide plate from the periphery of the light guide plate, and exits from a light emission plane of the light guide plate. The light source requires a particular light mixing distance. Therefore, a non-luminous or dim area is prone to occur around the light guide plate, resulting in uneven light emission. In addition, when the backlight source needs to provide large-area light emission on an entire surface, the light guide plate needs to be thick enough such that a length of a transmission path of internal light is increased. Therefore, the backlight module has a relatively large thickness. As a result, problems such as uneven light emission and a relatively large thickness are prone to occur on the edge-type backlight source.

Lamp beads of the direct-type backlight source need to be packaged separately, to form separate lamp beads that provide white light. Then, the lamp beads are arranged on a backlight board according to a matrix with a relatively large size interval, where the size interval is usually greater than 10 millimeters (mm). A prism structure with a special structural design is provided above each lamp bead. In this way, dot-like diverged light from a light source of a light-emitting diode (LED) lamp bead is converted into approximately parallel emergent light of a wider range, and then an even light source is provided at a particular height position (which is usually greater than 10 mm), thereby providing an even backlight source. Therefore, a light mixing height required by the direct-type backlight source results in a very large overall thickness of the backlight source. As a result, the direct-type backlight source is mainly applied to large-sized liquid-crystal display (LCD) products such as television sets, and can hardly be applied to terminals such as mobile phones that have very high requirements on lightness and thinness.

SUMMARY

Embodiments of this application provide a backlight module that emits light evenly and has a relatively small thickness, and a display screen and a terminal to which the backlight module is applied.

According to a first aspect, an embodiment of this application provides a backlight module. The backlight module includes a substrate, a plurality of spot light sources, an optical conversion layer, and a light mixing member. The plurality of spot light sources are fastened onto the substrate in a mutually spaced manner. The optical conversion layer is stacked on the substrate and covers the plurality of spot light sources. The optical conversion layer is configured to convert light from the plurality of spot light sources into a white surface light source. A light emission plane of the white surface light source is approximately parallel to the substrate, and the backlight module emits light in a direct manner. The light mixing member is located on a surface of the optical conversion layer or embedded into the optical conversion layer. The light mixing member is configured to mix the light.

In this embodiment, the optical conversion layer of the backlight module covers all of the plurality of spot light sources, to convert the light from the plurality of spot light sources into the white surface light source. The light mixing member having a light mixing function is disposed on the surface of the optical conversion layer or embedded into the optical conversion layer, to cooperate with the optical conversion layer to improve light emission evenness of the white surface light source. Therefore, the backlight module evenly emits light, and a light mixing height that is required in an existing direct-type backlight source does not need to be reserved. Therefore, the backlight module has a relatively small thickness, and the backlight module can be applied to a display screen and a terminal that have relatively high requirements on lightness and thinness. The backlight module uses direct light emission and can provide a highly even surface light source. Therefore, the display screen and the terminal to which the backlight module is applied can implement full-screen display, and have a high contrast. In addition, the plurality of spot light sources may be controlled using a control circuit and a control algorithm, to reduce power consumption, thereby prolonging a battery life.

The plurality of spot light sources are electrically connected to the substrate. The substrate may be a printed circuit board, and the substrate supplies power to the plurality of spot light sources. In an implementation, the plurality of spot light sources are controlled independently using a circuit on the substrate, such that a working mode in which some spot light sources are lit or a working mode in which all the spot light sources are lit may be selected. This achieves diversified display and can reduce power consumption, thereby prolonging battery life of the backlight module and the display screen and the terminal to which the backlight module is applied. In an implementation, the substrate is a rigid substrate, and the backlight module provides a planar surface light source. In an implementation, the substrate may be a flexible substrate. For example, the substrate may be a flexible printed circuit board. Assembly and mold pressing on the flexible printed circuit board may be implemented by jig design, device modification, and technical parameter adjustment, such that the backlight module provides a curved surface light source and the display screen may be a curved display screen.

LED chips are used as the spot light sources. A length of a single LED chip is within a range of 0.005 mm to 0.2 mm, a width of the LED chip is within a range of 0.005 mm to 1 mm, and a thickness of the LED chip is within a range of 0.001 mm to 0.2 mm. The LED chip is any one of a blue light chip, a green light chip, a red light chip, or a near-ultraviolet light chip. The plurality of spot light sources are approximately arranged as a matrix on the substrate. An onboard layout pitch between the plurality of spot light sources on the substrate is within a range of 0.01 mm to 3 mm. A thickness of the substrate is within a range of 0.01 mm to 0.4 mm. The plurality of spot light sources are all welded onto the substrate using a surface mount technology (SMT) and direct attach (DA) or a mass transfer technology, to reduce costs.

The light mixing member according to this application has a plurality of implementations. The backlight module may use one or more of the implementations, to improve a light mixing effect. The light mixing member may have the following several implementations In an implementation, the light mixing member includes a plurality of diffusion powders. The plurality of diffusion powders are distributed in the optical conversion layer. The diffusion powders are configured to break up and atomize light, to implement light diffusion and mixing. The diffusion powders are chemical powers with a particle size ranging from 50 nanometers (nm) to 100 micrometers (µm). A mixing proportion of the diffusion powders in the optical conversion layer is 0-50%.

The plurality of diffusion powders are distributed in the optical conversion layer. Therefore, the light mixing member does not need to occupy thickness space of the backlight module. This is favorable for lightness and thinness of the backlight module, the display screen, and the terminal. In addition, the light mixing member may be formed while the optical conversion layer is formed. This simplifies a procedure for fabricating the backlight module, reducing fabricating costs of the backlight module.

In an implementation, the light mixing member includes a plurality of membranes. The plurality of membranes are configured to transmit some light and reflect the other light. The plurality of membranes are thin film structures having transmission and reflection functions. The plurality of membranes are embedded into the optical conversion layer or located on a surface that is of the optical conversion layer and that is away from the substrate. The plurality of membranes are aligned with the plurality of spot light sources in a one-to-one correspondence. That is, the plurality of membranes are located right above the plurality of spot light sources in a one-to-one correspondence.

An implementation of the light mixing member is as follows. The plurality of membranes may be in contact with both the plurality of spot light sources and the optical conversion layer. For example, the plurality of membranes are laminated onto upper surfaces of the plurality of spot light sources in a one-to-one correspondence. In this case, the optical conversion layer encloses both the plurality of spot light sources and the plurality of membranes. Another implementation of the light mixing member is as follows. The plurality of membranes are completely enclosed by the optical conversion layer, or located on the surface that is of the optical conversion layer and that is away from the substrate. In this case, the plurality of membranes and the plurality of spot light sources are disposed in a spaced manner.

The plurality of membranes are aligned with the plurality of spot light sources, and the membranes have transmission and reflection functions. Therefore, the plurality of membranes can reduce luminance in a central area of the plurality of spot light sources, to achieve a light mixing effect.

A size of the membrane is set based on a distance between the membrane and the spot light source and a light emission angle of the spot light source by considering both a light mixing effect and overall light emission luminance of the backlight module. When the membrane is close to the spot light source, the size of the membrane is relatively small, or when the membrane is far away from the spot light source, the size of the membrane is relatively large. For example, when the membrane is in contact with the upper surface of the spot light source, the size of the membrane is smaller than a size of the upper surface of the spot light source. When the membrane is located on an upper surface that is of the optical conversion layer and that is away from the spot light source, the size of the membrane is greater than a size of the upper surface of the spot light source. A shape of the membrane may be determined according to an optical design. For example, the shape may be a circle or a square. A material of the membrane may be an amorphous membrane of titanic oxide or silicon oxide, where the titanic oxide or the silicon oxide is distributed as particles in a solvent, may be a thin layer coated with metal such as aluminum, copper, or silver, may be a photonic crystal-related material, may be optical glue or a white ink layer with a high refractive index, or the like. A thickness of the membrane is within a range of 0.1 µm to 50 µm. Certainly, the membrane may alternatively be set to another thickness based on an optical design requirement. A transmittance and a reflectivity of the membrane are designed based on a light mixing requirement. A size of the membrane is adjusted based on the light mixing requirement and the transmittance and the reflectivity.

In an implementation, the light mixing member includes a plurality of micro structural blocks, and the plurality of micro structural blocks are configured to perform optical diffusion on light. The plurality of micro structural blocks are embedded into the optical conversion layer or located on the surface that is of the optical conversion layer and that is away from the substrate. The plurality of micro structural blocks are configured to perform optical diffusion on passing light, to achieve a light mixing effect.

A related surface shape of the micro structural block may be implemented through imprinting, etching, diamond cutting, or the like. The surface shape may be a sphere, a hemisphere, an ellipsoid, a cylinder, a cuboid, a prism shape, a prism column shape, or the like.

In an implementation, the light mixing member includes a reflective film. The reflective film is provided with a plurality of hollowed areas. The reflective film is located on a surface of the optical conversion layer facing the substrate. The reflective film is in contact with the substrate, and the plurality of spot light sources are located in the plurality of hollowed areas in a one-to-one correspondence. The reflective film may be made of a membrane material having a high reflectivity, for example, a distributed Bragg reflector (DBR) or an enhanced specular reflector (ESR). A reflectivity of the reflective film is greater than or equal to 80%. A thickness of the reflective film is from 0.01 mm to 0.1 mm. The reflective improves light utilization while implementing light mixing, thereby ensuring optical efficiency of the plurality of spot light sources and reducing power consumption of the backlight module.

In an optional embodiment, the optical conversion layer according to this application has a plurality of implementations, and the backlight module may use any one of the implementations. The optical conversion layer may have the following several implementations.

In an implementation, the optical conversion layer includes a base material, and a phosphor and/or quantum dots distributed in the base material. That is, the optical conversion layer includes the phosphor, the optical conversion layer includes the quantum dots, or the optical conversion layer includes the phosphor and the quantum dots. The optical conversion layer is in contact with the substrate and encloses the plurality of spot light sources. The phosphor or the quantum dots are configured to convert, into white light, the light emitted by the plurality of spot light sources. For example, when the plurality of spot light sources emit blue light, the phosphor or the quantum dots can convert the blue light into green light and red light, which are finally mixed to obtain white light.

In a direction perpendicular to the substrate, a thickness of the optical conversion layer is greater than a thickness of the plurality of spot light sources. The thickness of the optical conversion layer is within a range of 0.1 mm to 0.6 mm.

The phosphor in the base material is in a form of a compound, and may include but is not limited to a red-light phosphor (one or more of oxynitride, fluoride, and nitride), a green-light phosphor (one or both of sialon and silicate), a yellow phosphor (one or both of yttrium aluminium garnet and silicate), and a blue phosphor (one or both of barium aluminate and aluminate). The base material may be optical silica gel or an ultraviolet (UV)-cured (UV) glue material. The optical silica gel may include but is not limited to organic silica gel and inorganic silica gel. The organic silica gel includes a compound of one or more of silicone rubber, silicone resin, and silicone oil. The inorganic silica gel includes a compound of one or more of type B silica gel, coarse-porous silica gel, and fine-porous silica gel.

A particle size of the phosphor in the base material ranges from 2 μm to 50 μm. A particle size of the quantum dots in the base material ranges from 2 nm to 100 nm. A mixing proportion of the phosphor and or the quantum dots in the base material is 2-80%. A single type of phosphor and/or quantum dots may be mixed, or a plurality of types of phosphor and/or quantum dots may be mixed.

In an implementation, the optical conversion layer includes a packaging layer and a conversion layer. The packaging layer is made of a transparent material. For example, the packaging layer may be made of optical silica gel or an ultraviolet-cured glue material. A thickness of the packaging layer is greater than a thickness of the plurality of spot light sources. The packaging layer is in contact with the substrate and encloses the plurality of spot light sources. That is, the packaging layer packages the plurality of spot light sources. The conversion layer includes a phosphor and/or quantum dots. A membrane material of the conversion layer is optical silica gel or an ultraviolet-cured glue material. The phosphor and/or the quantum dots are evenly distributed in the membrane material of the conversion layer. The conversion layer covers a side that is of the packaging layer and that is away from the substrate. The conversion layer is separated from the plurality of spot light sources by the packaging layer. This can effectively prevent the phosphor in a fluorescent layer of the conversion layer from coming into direct contact with the plurality of spot light sources at a high temperature, to prevent the phosphor from being exhausted due to heat, thereby prolonging a service life of the backlight module.

The optical conversion layer further includes a protection layer. The protection layer is located on a side that is of the conversion layer and that is away from the packaging layer. The protection layer may be made of optical silica gel or an ultraviolet-cured glue material, to form a transparent adhesive layer. The protection layer may be formed through mold pressing.

The conversion layer is formed, through coating, spaying, or mold pressing, on a surface that is of the packaging layer and that is away from the substrate. The surface that is of the packaging layer and that is away from the substrate may be a flat plane, such that the conversion layer is formed on the packaging layer with better quality. Alternatively, the conversion layer is an optical conversion membrane. The optical conversion membrane is bonded, using optical clear adhesive, to the surface that is of the packaging layer and that is away from the substrate, or the optical conversion membrane is fastened, through spaced mounting, onto the surface that is of the packaging layer and that is away from the substrate.

In an implementation, the optical conversion layer includes a first conversion sublayer and a second conversion sublayer. The first conversion sublayer includes a first phosphor. A membrane material of the first conversion sublayer is optical silica gel or an ultraviolet-cured glue material. The first phosphor is evenly distributed in the membrane material of the first conversion sublayer. The first conversion sublayer is in contact with the substrate and encloses the plurality of spot light sources. A thickness of the first conversion sublayer is greater than the thickness of the plurality of spot light sources. The second conversion sublayer includes a second phosphor. A membrane material of the second conversion sublayer is optical silica gel or an ultraviolet-cured glue material. The second phosphor is evenly distributed in the membrane material of the second conversion sublayer. The second conversion sublayer covers a side that is of the first conversion sublayer and that is away from the substrate. The first phosphor and the second phosphor cooperate with each other to convert the light from the plurality of spot light sources into white light. For example, the first phosphor is green phosphor, and the second phosphor is red phosphor, or the first phosphor is red phosphor, and the second phosphor is green phosphor.

The second conversion sublayer is formed, through coating, spaying, or mold pressing, on a surface that is of the first conversion sublayer and that is away from the substrate. The surface that is of the first conversion sublayer and that is away from the substrate may be a flat plane, such that the second conversion sublayer is formed on the first conversion sublayer with better quality. Alternatively, the second conversion sublayer is an optical conversion membrane. The optical conversion membrane is bonded, using optical clear adhesive, to the surface that is of the first conversion sublayer and that is away from the substrate, or the optical conversion membrane is fastened, through spaced mounting, onto the surface that is of the first conversion sublayer and that is away from the substrate.

In an implementation, the optical conversion layer includes a plurality of conversion thin films and a packaging element. The plurality of conversion thin films include a phosphor and/or quantum dots. A membrane material of the conversion thin film is optical silica gel or an ultraviolet-cured glue material. The phosphor and/or the quantum dots are evenly distributed in the membrane material of the conversion thin film. The plurality of conversion thin films enclose the plurality of spot light sources in a one-to-one correspondence. The plurality of conversion thin films may be formed on surfaces of the plurality of spot light sources through spraying or by performing mold pressing on the membrane material in a vacuum. The packaging element is made of a transparent material. For example, the packaging element may be made of optical silica gel or an ultraviolet-cured glue material. The packaging element is in contact with the substrate and encloses the plurality of conversion thin films. The packaging element may be formed through mold pressing. A thickness of the packaging element is greater than the thickness of the plurality of spot light sources. A thickness of the conversion thin film is within a range of 0.01 mm to 0.2 mm.

In an implementation, the backlight module further includes an optical membrane assembly. The optical membrane assembly is located on a side that is of the optical conversion layer and that is away from the substrate. The optical membrane assembly is configured to mix and brighten passing light. The light emitted by the plurality of spot light sources is mixed for a first time by the light mixing member, and mixed for a second time by the optical membrane assembly, thereby achieving better light emission evenness for the backlight module. An overall thickness of the backlight module according to this application is within a range of 0.4 mm to 2 mm. This is favorable for implementing lightness and thinness of the display screen and the terminal. Power consumption and costs of the backlight module according to this application are equivalent to those of an existing edge-type backlight source.

In an implementation, the optical membrane assembly is bonded to the optical conversion layer using a bonding layer. The bonding layer fastens the optical membrane assembly and the optical conversion layer together, and a connection relationship is reliable. In addition, compared to air, the bonding layer can effectively improve light extraction efficiency and reduce optical losses. The bonding layer includes diffusion particles. A proportion of the diffusion particles is within a range of 0-50%, to meet both a transparency requirement and a light mixing requirement. A diameter of the diffusion particles added into the bonding layer is within a range of 50 nm to 100 μm. A material of the diffusion particles includes but is not limited to polymethyl methacrylate (PMMA), silicon dioxide, metal ions, and the like. A difference between a refractive index of diffusion particles and a refractive index of adhesive of the bonding layer is within a range of 0.1-0.5. After the diffusion particles are added, a light transmittance of the bonding layer is greater than 50%.

In an implementation, the backlight module further includes a backplane, a plastic frame, and square-shaped adhesive. The plastic frame is connected around the backplane, to jointly encircle an accommodation space. The substrate, the optical conversion layer, and the optical membrane assembly are all accommodated in the accommodation space. The square-shaped adhesive bonds the optical membrane assembly and the plastic frame. In this case, the optical membrane assembly is mounted on the optical conversion layer in a spaced manner, and there is an air gap between the optical membrane assembly and the optical conversion layer.

The optical membrane assembly further includes a plurality of light mixing thin films. The light mixing thin films are configured to transmit some light and reflect the other light. The plurality of light mixing thin films are located on a surface of the optical membrane assembly facing the optical conversion layer. The plurality of light mixing thin films are aligned with the plurality of spot light sources in a one-to-one correspondence. That is, the plurality of light mixing thin films are located right above the plurality of spot light sources in a one-to-one correspondence. The plurality of light mixing thin films can further reduce the luminance in the central area of the plurality of spot light sources, to achieve the light mixing effect, thereby achieving better light emission evenness for the backlight module.

In an implementation, the optical membrane assembly includes a first prism film, a diffusion film, and a second prism film that are stacked in sequence. The first prism film is located between the optical conversion layer and the diffusion film, and the first prism film and the second prism film cooperate with each other to brighten passing light. In this case, the plurality of light mixing thin films are located on a side of the first prism film facing the optical conversion layer.

The diffusion film is configured to provide an even surface light source for the backlight module. A material having a high light transmittance, for example, polyethylene terephthalate (PET)/polycarbonate (PC)/PMMA, needs to be selected as a base material of the diffusion film. The diffusion film is mainly made by adding chemical grains as scattering particles into the base material of the diffusion film. However, in an existing diffusion board, micro-particles are distributed between resin layers. As a result, when passing through the diffusion film, light constantly passes through two media having different refractive indexes. In this process, the light is refracted, reflected, and scattered, resulting in an optical diffusion effect. The diffusion film includes an antistatic coating layer, a PET base material, and a diffusion layer that are stacked in sequence in a light emission direction. The diffusion film may be a scattered particle-type diffusion film, a bulk diffusion film, or the like.

The first prism film and the second prism film each are a transparent plastic thin film with a thickness between 50 and 300 μm. A layer of prism structure is overlaid evenly and neatly on an upper surface of the thin film. The first prism film and the second prism film are configured to improve angular distribution of light, such that diverged light is converged to an axial angle, that is, a front view angle. This improves axial luminance without increasing an overall emergent luminous flux, thereby implementing brightening. A membrane material of the first prism film and the second prism film each may be a single-layer prism film or a double-layer bonding prism film (an angle between the two layers may be changed as required). A prism shape may be a regular strip prism, a pyramid, a frustum, a cone, or the like. Prism patterns may use different parameters, for example, different angles (for example, vertex angles of 30° to 60°), a cycle is changed as required, or the like.

The first prism film and the diffusion film are bonded using a transparent bonding layer, and the diffusion film and the first prism film are bonded using a transparent bonding layer. The transparent bonding layer may be made of optical silica gel or an ultraviolet-cured glue material. Diffusion particles may be added into the transparent bonding layer to enhance the light mixing effect. Certainly, in another implementation, alternatively, the first prism film and the diffusion film may be fastened using adhesive in a periphery, and the diffusion film and the first prism film may be fastened using adhesive in a periphery, to implement spaced mounting. In this case, there is an air gap between the first prism film and the diffusion film, and there is an air gap between the diffusion film and the first prism film. Adhesive of the transparent bonding layer may be fluid, and formed through slit coating or spraying. Alternatively, adhesive of the transparent bonding layer may be a plate viscoelastic body.

In another implementation, alternatively, a combination manner of the optical membrane assembly may be: a diffusion film+a prism film, or a diffusion film+a prism film+a diffusion film+a prism film. A topmost layer that is of the optical membrane assembly and that is away from the optical conversion layer is a prism film.

In a specific embodiment, the foregoing various implementations of the light mixing member, the foregoing various implementations of the optical conversion layer, and the foregoing various implementations of the optical membrane assembly may be combined randomly.

According to a second aspect, an embodiment of this application further provides a display screen, including a LCD panel and any one of the foregoing backlight modules. The backlight module is configured to provide a backlight source for the LCD panel. The backlight module emits light evenly and has a relatively small thickness. Therefore, the display screen can implement full-screen display, and has a high contrast and a small thickness.

According to a third aspect, an embodiment of this application further provides a terminal. The terminal includes the foregoing display screen. The terminal can implement full-screen display, has a high contrast, and is light and thin.

According to a fourth aspect, an embodiment of this application further provides a backlight module fabricating method. The backlight module fabrication method is used to prepare the backlight module according to any of the foregoing embodiments.

The backlight module fabrication method includes the following steps.

Step 1: Mount a plurality of spot light sources onto a substrate.

Step 2: Process an optical conversion layer and a light mixing member.

Step 3: Perform cutting and forming.

Step 4: Process an optical membrane assembly, to form a backlight module.

Step 1 includes providing the substrate, fastening the plurality of spot light sources onto the substrate according to a particular arrangement rule, and establish an electrical connection.

Step 2 includes a plurality of solutions.

Solution 1:

Provide a half-cured membrane or liquid adhesive that mainly includes optical silica gel or ultraviolet-cured glue and in which a phosphor and a diffusion powder are evenly mixed, place, at a mold fastening position of an injection molding device or a hot-pressing device, the substrate onto which the plurality of spot light sources are assembled in step 1, and overlay the half-cured membrane or the liquid adhesive on the substrate or at a position corresponding to a mold, and press-fit the membrane material onto the substrate through hot-pressing and vaccumization, to form the optical conversion layer that completely encloses the plurality of spot light sources.

Solution 2:

First step: Provide a half-cured membrane or liquid adhesive that mainly includes optical silica gel or ultraviolet-cured glue and in which diffusion powder particles are evenly mixed, place, at a mold fastening position of an injection molding device or a hot-pressing device, the substrate onto which the plurality of spot light sources are assembled in step 1, and then overlay the half-cured membrane or the liquid adhesive above the substrate or at a position corresponding to a mold, and then press-fit the membrane material onto the substrate through hot-pressing and vaccumization, to form a packaging layer that completely encloses the plurality of spot light sources.

Second step: Form, by spraying, coating, or mold pressing, a conversion layer on a surface that is of the packaging layer and that is away from a surface of the substrate, or bond an optical conversion membrane using a transparent adhesive material (for example, optical clear adhesive) or mount an optical conversion membrane in a spaced manner.

Third step: Repeat step 1 to form a protection layer on a surface that is of the conversion layer and that is away from the packaging layer. (This step may be omitted.)

Solution 3:

First step: Provide a half-cured membrane or liquid adhesive that mainly includes optical silica gel or ultraviolet-cured glue and in which a first phosphor and diffusion powder particles are evenly mixed, place, at a mold fastening position of an injection molding device or a hot-pressing device, the substrate onto which the plurality of spot light sources are assembled in step 1, and then overlay the half-cured membrane or the liquid adhesive above the substrate or at a position corresponding to a mold, and then press-fit the membrane material onto the substrate in through hot-pressing and vaccumization, to form a first conversion sublayer that completely encloses the plurality of spot light sources.

Second step: Then, perform spaying, coating, or mold-pressing on a surface that is of the first conversion sublayer and that is away from the substrate to form a second conversion sublayer that has a second phosphor and that matches the first step, bond, to a surface that is of the first conversion sublayer and that is away from the substrate using a transparent adhesive material, a second conversion sublayer that has a second phosphor and that matches the first step, or mount, in a spaced manner to a surface that is of the first conversion sublayer and that is away from the substrate, a second conversion sublayer that has a second phosphor and that matches the first step.

Solution 4:

First step: Provide a half-cured membrane that mainly includes optical silica gel or ultraviolet-cured glue and in which a phosphor is evenly mixed, place, at a mold fastening position of a vacuum heating device, the substrate onto which the plurality of spot light sources are assembled in step 1, and then overlay the half-cured membrane at a corresponding position on a surface of the substrate, and then attach the membrane material onto the substrate through vaccumization and heating, to form a plurality of conversion thin films that completely enclose the plurality of spot light sources.

Second step: Provide a half-cured membrane or liquid adhesive that mainly includes optical silica gel or ultraviolet-cured glue and in which a diffusion powder is evenly mixed, place, at a mold fastening position of an injection molding device or a hot-pressing device, the substrate on which the first step is completed, and then overlay the half-cured membrane or the liquid adhesive above the substrate or at a position corresponding to a mold, and then press-fit the membrane material onto the substrate in through hot-pressing and vaccumization, to form a packaging element that completely encloses the plurality of conversion thin films.

Solution 5:

First step: Provide a material having both transmission and reflection functions, form a thin film on upper surfaces of the plurality of spot light sources through spraying, coating, printing, or the like, and form a plurality of membranes by heating and baking or by ultraviolet curing.

Second step: Same as the step in solution 1 to solution 4. In this solution, the plurality of membranes is laminated onto the upper surfaces of the plurality of spot light sources in a one-to-one correspondence.

Solution 6:

First step: Same as the step in solution 1.

Second step: Provide a material having both transmission and reflection functions, design a particular opening using a mask, form a thin film on a surface of the optical conversion layer using a spraying or coating technology or using a metal stencil printing or silk-screen printing technology, and form a plurality of membranes by heating and baking or by ultraviolet curing.

Solution 7:

On a basis of the steps in solution 2, the following step is added after the first step, the second step, or the third step in solution 2: providing a material having both transmission and reflection functions, designing a particular opening using a mask, forming a thin film on a surface of the packaging layer, a surface of the conversion layer, or a surface of the protection layer using a spraying or coating technology or using a metal stencil printing or silk-screen printing technology, and forming a plurality of membranes by heating and baking or by ultraviolet curing. In this case, the plurality of membranes are located between the packaging layer and the conversion layer, between the conversion layer and the protection layer, or on a side that is of the protection layer and that is away from the conversion layer. When the plurality of membranes are located between the packaging layer and the conversion layer or between the conversion layer and the protection layer, the plurality of membranes are embedded into the optical conversion layer, and the optical conversion layer completely encloses the plurality of membranes.

Solution 8:

On a basis of the steps in solution 3, the following step is added after the first step or the second step in solution 3: providing a material having both transmission and reflection functions, designing a particular opening using a mask, forming a thin film on a surface of the first conversion sublayer or a surface of the second conversion sublayer using a spraying or coating technology or using a metal stencil printing or silk-screen printing technology, and forming a plurality of membranes by heating and baking or by ultraviolet curing. In this case, the plurality of membranes are formed between the first conversion sublayer and the second conversion sublayer or on a side that is of the second conversion sublayer and that is away from the first conversion sublayer.

Solution 9:

On a basis of the steps in solution 4, the following step is added after the first step or the second step is completed: providing a material having both transmission and reflection functions, designing a particular opening using a mask, forming a thin film on a surface of the plurality of conversion thin films or a surface of the packaging element using a spraying or coating technology or using a metal stencil printing or silk-screen printing technology, and forming a plurality of membranes by heating and baking or by ultraviolet curing. In this case, the plurality of membranes are formed between the conversion thin films and the packaging element or on a surface that is of the packaging element and that is away from the conversion thin films.

Solution 10:

First step: Same as the step in solution 1.

Second step: Form, on a surface of the optical conversion layer through imprinting, etching, diamond cutting, or the like, a micro structural block for optical diffusion.

Solution 11:

On a basis of the steps in solution 2, the following step is added after the first step, the second step, or the third step is completed: forming, on a surface of the optical conversion layer or a surface of a transparent film layer through imprinting, etching, diamond cutting, or the like, a micro structural block for optical diffusion. In this case, the micro structural block is located between the packaging layer and the conversion layer, between the conversion layer and the protection layer, or on a side that is of the protection layer and that is away from the conversion layer.

Solution 12:

On a basis of the steps in solution 3, the following step is added after the first step or the second step is completed: forming, on a surface of a green phosphor layer or a surface of a red phosphor layer through imprinting, etching, diamond cutting, or the like, a layer of micro structural block for optical diffusion. In this case, the micro structural block is formed between the first conversion sublayer and the second conversion sublayer or on a side that is of the second conversion sublayer and that is away from the first conversion sublayer.

Solution 13:

On a basis of the steps in solution 4, the following step is added after the first step or the second step is completed: forming, on a surface of the optical conversion layer or a surface of a transparent film layer through imprinting, etching, diamond cutting, or the like, a layer of micro structural block for optical diffusion. In this case, the micro structural block is formed between the conversion thin films and the packaging element or on a surface that is of the packaging element and that is away from the conversion thin films.

Solution 14:

First step: Provide a layer of reflective film having a high reflectivity, and fasten, through adhesive bonding or partial fastening, the reflective film onto the substrate on which step 1 is completed, where locations on the reflective film that correspond to the plurality of spot light sources are hollowed out for avoidance.

Second step: Same as the step in solution 1 to solution 4.

Step 3 includes: performing cutting and molding on a semi-finished product of the processed optical conversion layer and the light mixing member through laser cutting, mechanical cutting, or stamping to form a surface light source component having a required product appearance.

Step 4 includes a plurality of implementations:

In an implementation, the optical membrane assembly is an integrated membrane material, and the membrane material is connected to the optical conversion layer using a transparent adhesive material.

First step: Provide a transparent bonding material, and use a lamination device to bond one side of the bonding material to an obverse side of the surface light source component on which step 3 is completed.

Second step: Use the lamination device to bond the entire membrane material of the optical membrane assembly to a surface of the bonding material.

In an implementation, the optical membrane assembly is an integrated membrane material, and the membrane material and the optical conversion layer are mounted, in manner in which a periphery is fastened, with an air gap between the membrane material and the optical conversion layer.

First step: Provide a plastic frame and a backplane, and use a lamination device to fasten, onto the backplane using adhesive, a back side of the surface light source component on which step 3 is completed.

Second step: Use the lamination device to place the entire membrane material of the optical membrane assembly onto an obverse side of the surface light source component.

Third step: Provide square-shaped adhesive, and use the lamination device to bond and fasten the membrane material of the optical membrane assembly and the plastic frame at a periphery of the plastic frame.

In an implementation, the optical membrane assembly is separate membrane materials and is mounted with an air gap between the membrane materials. The membrane materials are connected to the optical conversion layer using a transparent adhesive material.

First step: Provide a transparent bonding material, and use a lamination device to bond one side of the bonding material to an obverse side of the surface light source component on which step 3 is completed.

Second step: Use the lamination device to laminate a prism film or a diffusion film at a bottom layer of the membrane materials of the optical membrane assembly onto a surface of the bonding material.

Third step: Provide a plastic frame and a backplane, and use the lamination device to fasten, onto the backplane using adhesive, a back side of the surface light source component on which the second step is completed.

Fourth step: Use the lamination device to place other membranes in sequence onto the obverse side of the surface light source component.

Fifth step: Provide square-shaped adhesive, and use the lamination device to bond and fasten the membranes of the optical membrane assembly and the plastic frame at a periphery of the plastic frame.

In an implementation, the optical membrane assembly is separate membrane materials and is mounted with an air gap between the membrane materials. The membrane materials and the optical conversion layer are mounted, in manner in which a periphery is fastened, with an air gap between the membrane materials and the optical conversion layer.

First step: Provide a plastic frame and a backplane, and use a lamination device to fasten, onto the backplane using adhesive, a back side of the surface light source component on which the second step is completed.

Second step: Use the lamination device to place membranes of the optical membrane assembly in sequence onto an obverse side of the surface light source component.

Third step: Provide square-shaped adhesive, and use the lamination device to bond and fasten the membranes of the optical membrane assembly and the plastic frame at a periphery of the plastic frame.

BRIEF DESCRIPTION OF DRAWINGS

To describe the technical solutions in some of the embodiments of this application more clearly, the following briefly describes the accompanying drawings describing some of the embodiments of this application.

DESCRIPTION OF EMBODIMENTS

The following describes embodiments of this application with reference to the accompanying drawings in the embodiments of this application.

Figure 1:
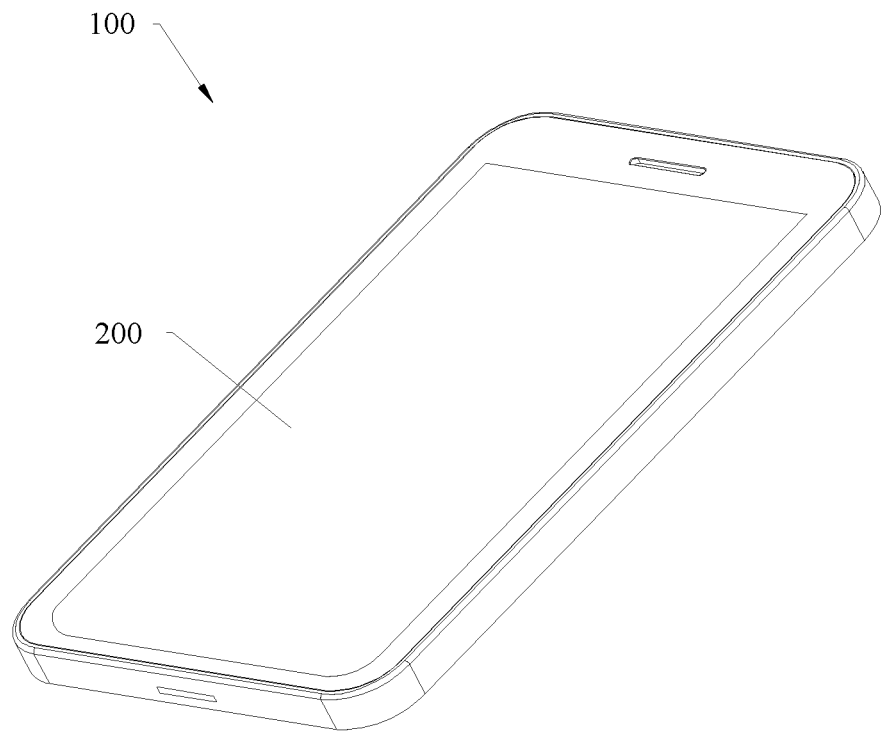
FIG. 1 is a schematic structural diagram of a terminal according to an embodiment of this application.
Figure 2:
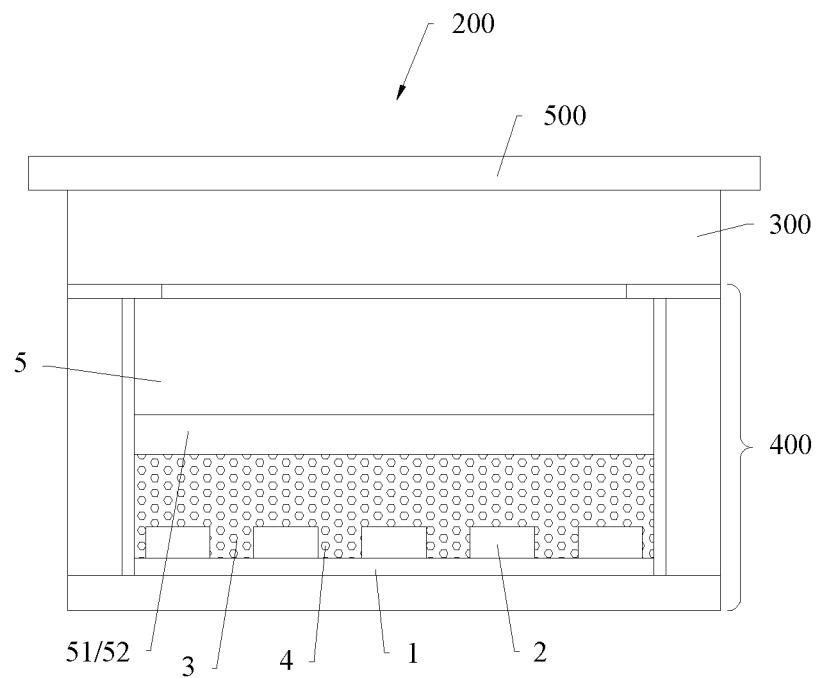
FIG. 2 is a schematic structural diagram of an implementation of a display screen of the terminal shown in FIG. 1.
Figure 3:
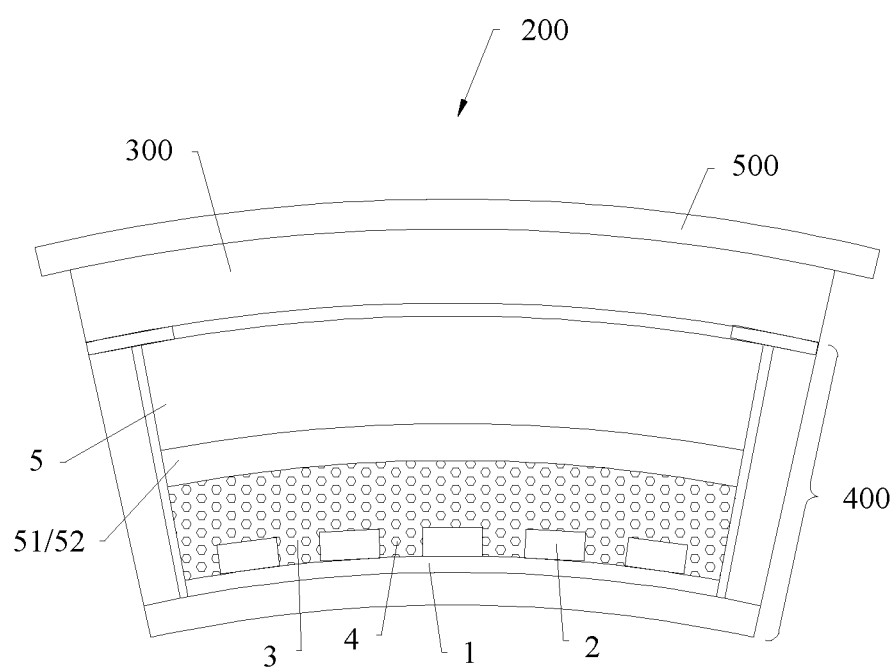
FIG. 3 is a schematic structural diagram of another implementation of a display screen of the terminal shown in FIG. 1.

With reference to FIG. 1 to FIG. 3, an embodiment of this application provides a terminal 100. The terminal 100 in this embodiment of this application may be any device having communication and storage functions, for example, an intelligent device having a network function, such as a tablet computer, a mobile phone, an e-reader, a remote control, a personal computer, a notebook computer, a vehicle-mounted device, a web television, a wearable device, or a television. The terminal 100 includes a display screen 200. The display screen 200 may be a touch display screen. The display screen 200 includes a liquid crystal display (LCD) panel 300 and a backlight module 400. The backlight module 400 is configured to provide a backlight source for the LCD panel 300.

The backlight module 400 and the LCD panel 300 are stacked. The backlight module 400 and the LCD panel 300 are mounted in a spaced manner. A basic rule in which the LCD panel 300 performs display is as follows. A liquid crystal material is padded between two parallel plates, and there are many vertical and horizontal tiny wires between two pieces of glass. Rod-shaped crystal molecules are controlled, by energizing or not energizing the tiny wires, to change directions to generate a picture through refraction of light. An arrangement status of molecules inside the liquid crystal material is changed using voltage, to block light or transmit light, thereby displaying a well-arranged image with different shades. In addition, a colored image can be displayed by adding a tricolor filter layer between the two flat plates. The display screen 200 further includes a coverplate 500. The coverplate 500 is stacked on a side that is of the LCD panel 300 and that is away from the backlight module 400. The coverplate 500 is configured to protect the LCD panel 300. The coverplate 500 and the LCD panel 300 may be bonded using optically clear adhesive (OCA).

Figure 4:
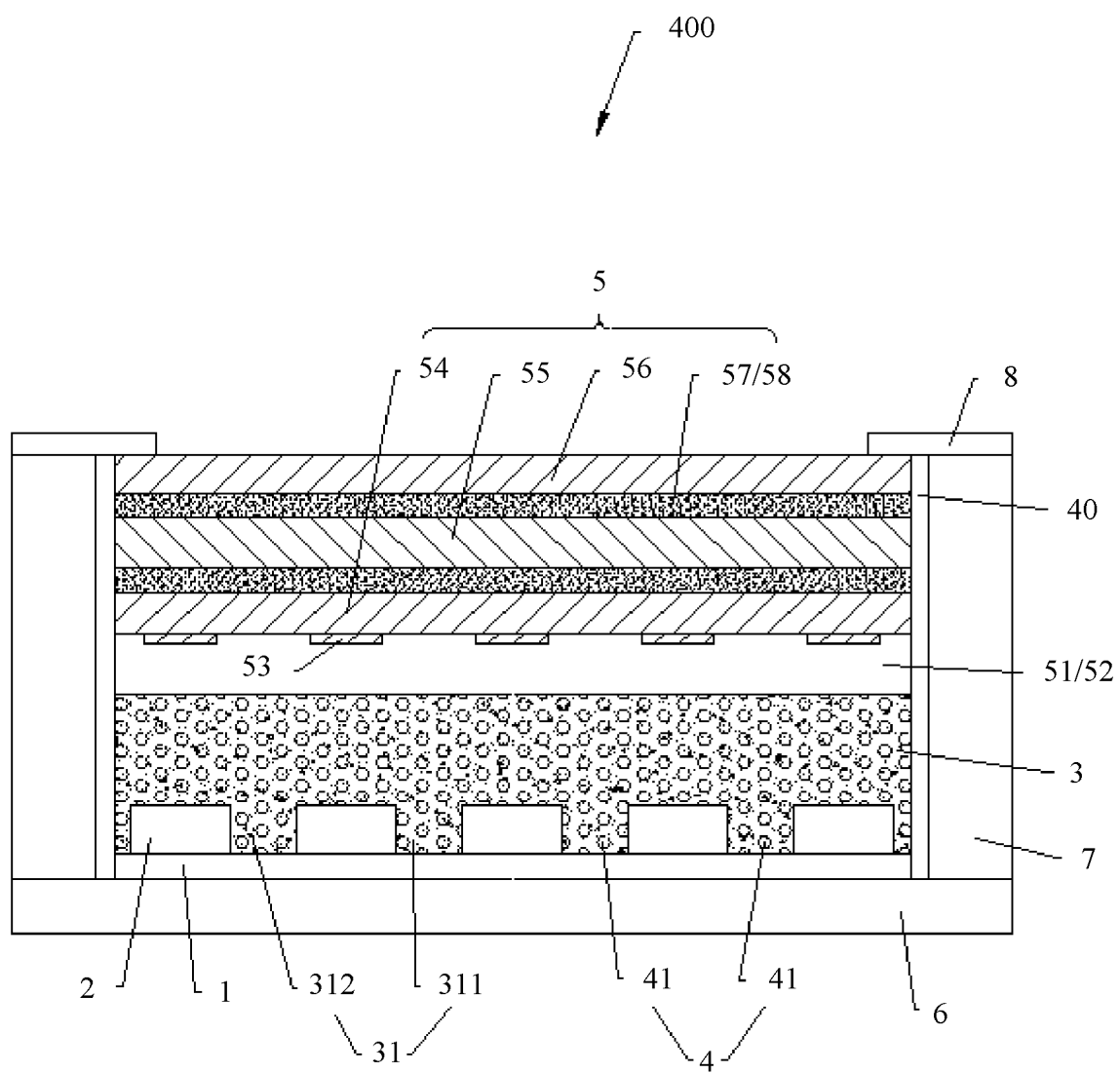
FIG. 4 is a schematic structural diagram of a first implementation of a backlight module in the display screen shown in FIG. 2.
Figure 5:
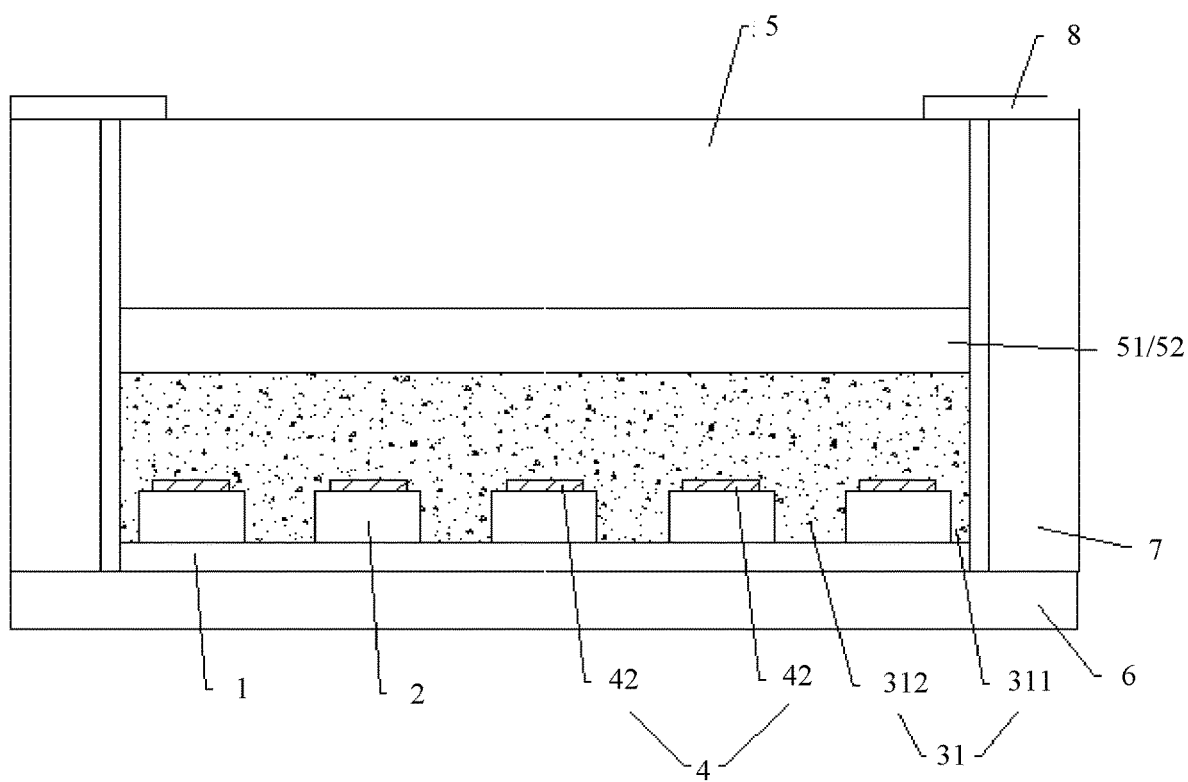
FIG. 5 is a schematic structural diagram of a second implementation of a backlight module in the display screen shown in FIG. 2.
Figure 6:
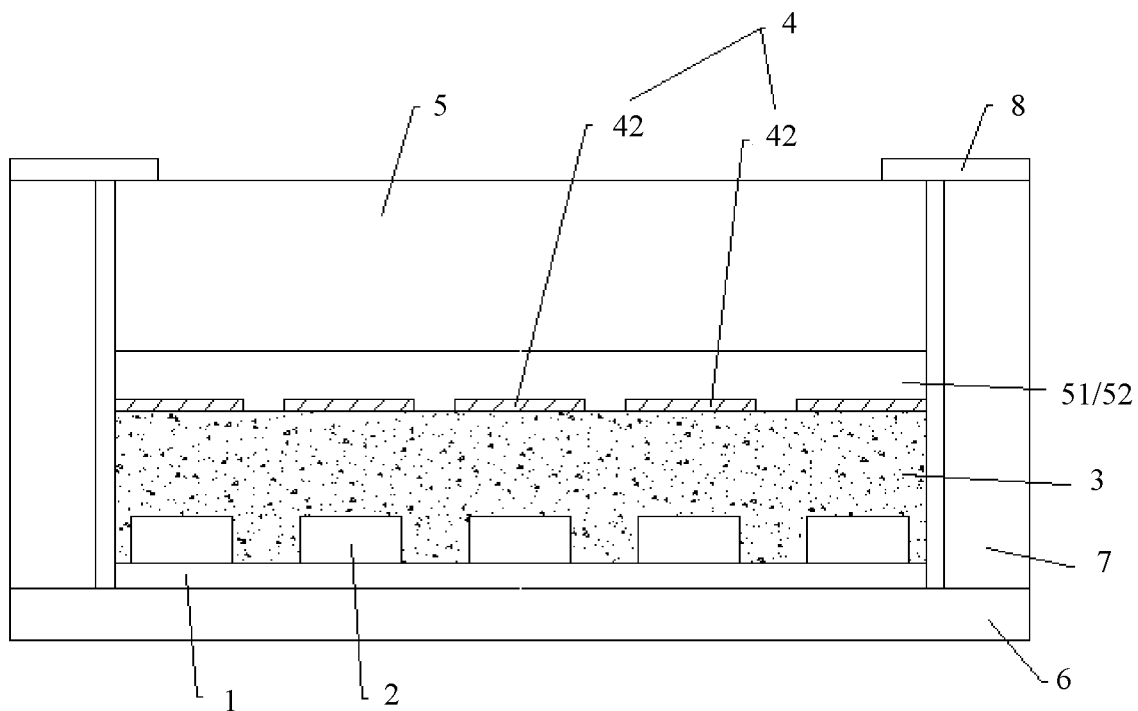
FIG. 6 is a schematic structural diagram of a third implementation of a backlight module in the display screen shown in FIG. 2.
Figure 7:
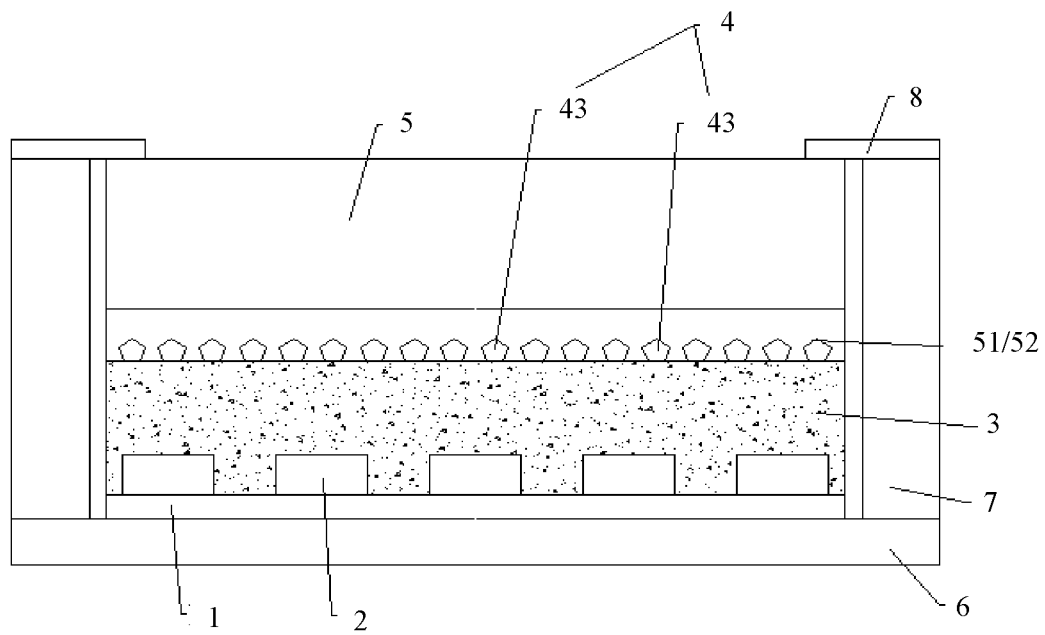
FIG. 7 is a schematic structural diagram of a fourth implementation of a backlight module in the display screen shown in FIG. 2.
Figure 8:
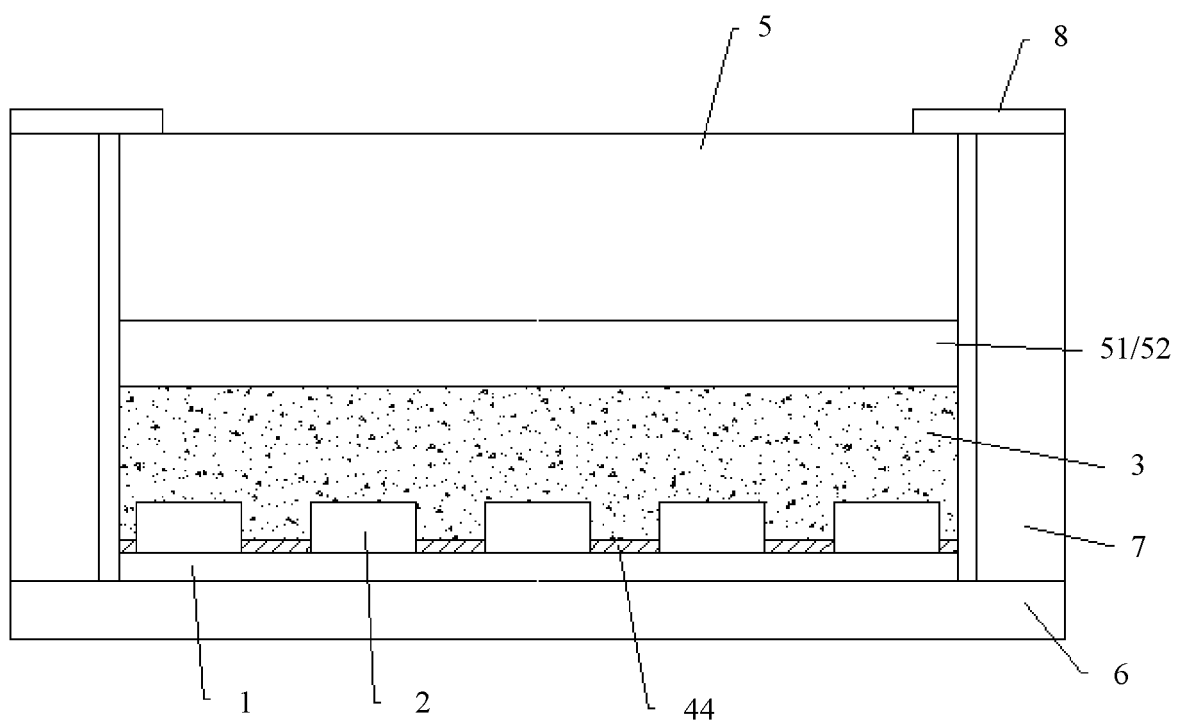
FIG. 8 is a schematic structural diagram of a fifth implementation of a backlight module in the display screen shown in FIG. 2.
Figure 9:
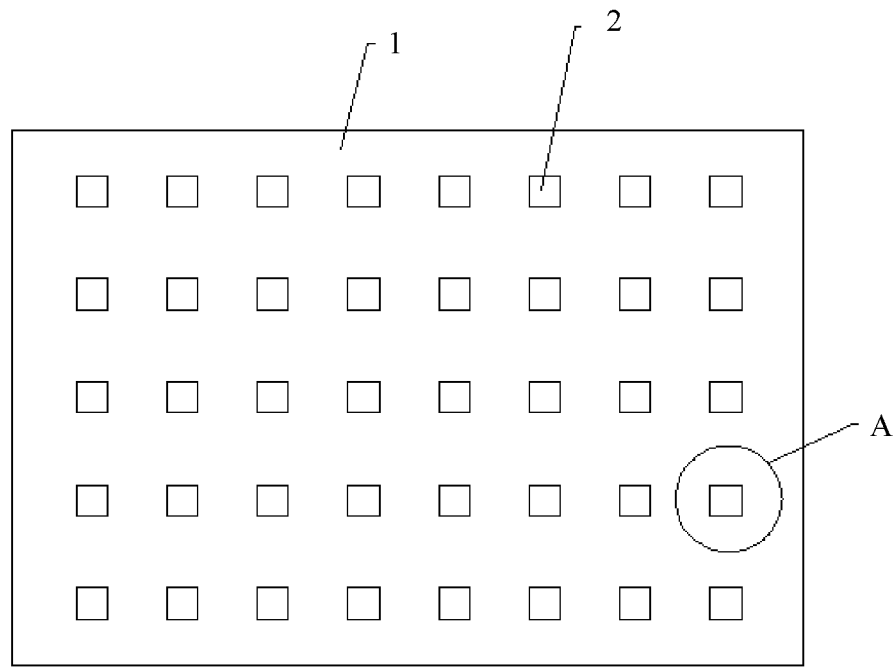
FIG. 9 is a schematic diagram of a connection relationship between a plurality of spot light sources and a substrate in the backlight module shown in FIG. 4.
Figure 10:
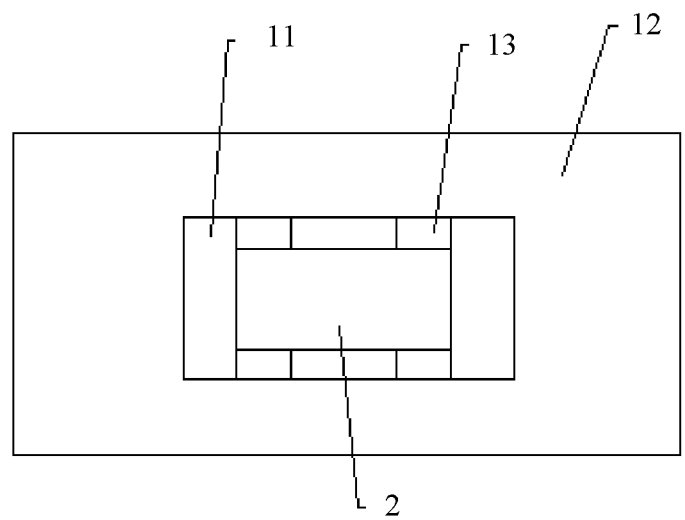
FIG. 10 is an enlarged schematic diagram of a structure at a position A in FIG. 9.
Figure 11:
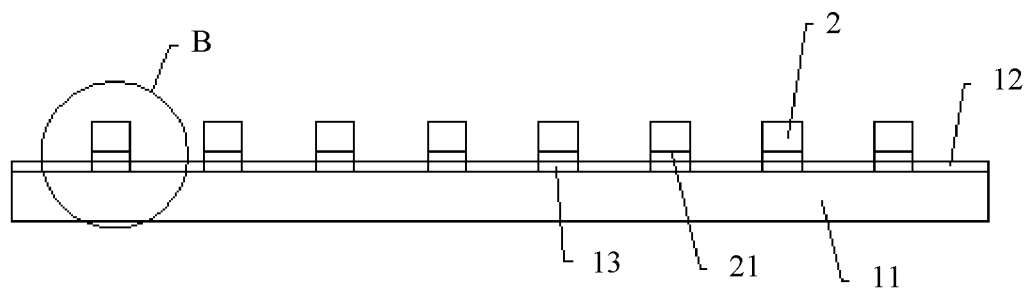
FIG. 11 is a schematic diagram, from another angle, of a structure shown in FIG. 9.
Figure 12:
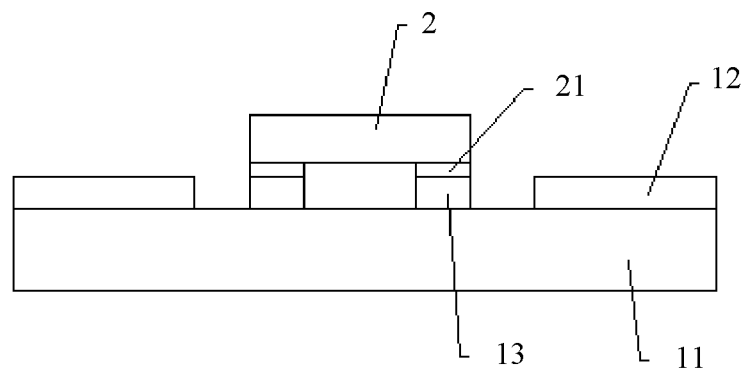
FIG. 12 is an enlarged schematic diagram of a structure at a position B in FIG. 11.
Figure 13A:
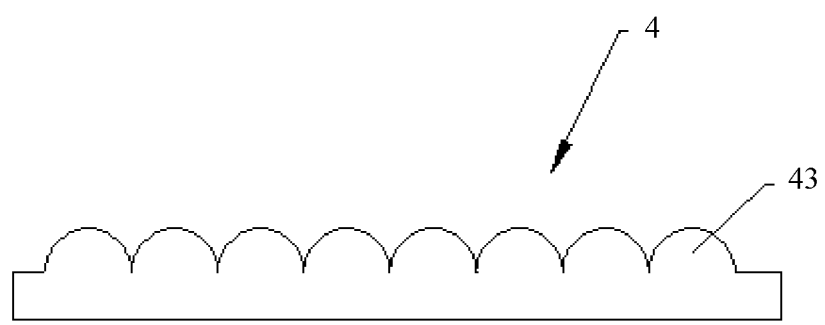
FIG. 13A is a schematic structural diagram of an implementation of a light mixing member shown in FIG. 7.
Figure 13B:
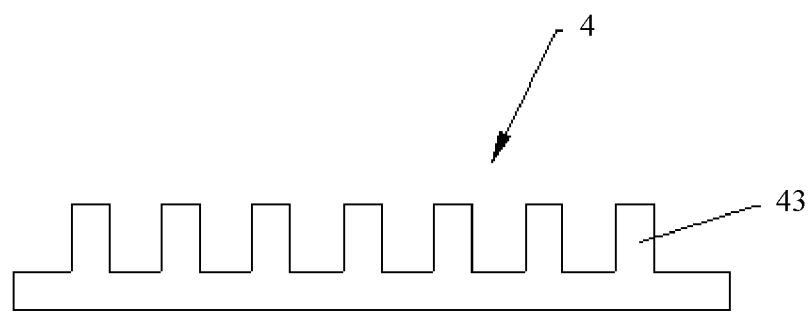
FIG. 13B is a schematic structural diagram of another implementation of a light mixing member shown in FIG. 7.
Figure 13C:
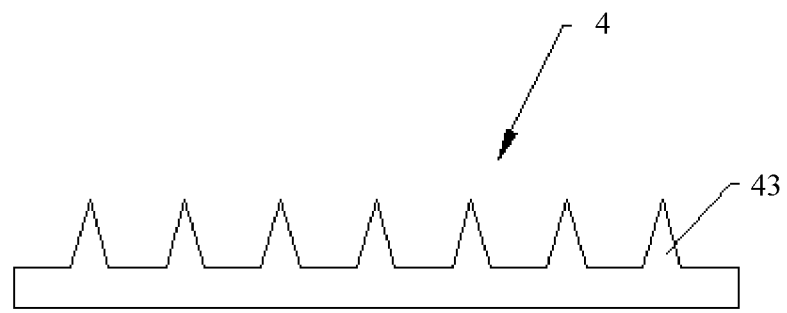
FIG. 13C is a schematic structural diagram of still another implementation of a light mixing member shown in FIG. 7.

With reference to FIG. 2 to FIG. 8, an embodiment of this application further provides a backlight module 400. The backlight module 400 includes a substrate 1, a plurality of spot light sources 2, an optical conversion layer 3, and a light mixing member 4. The plurality of spot light sources 2 are fastened onto the substrate 1 in a mutually spaced manner. The optical conversion layer 3 is stacked on the substrate 1 and covers the plurality of spot light sources 2. The optical conversion layer 3 is configured to convert light from the plurality of spot light sources 2 into a white surface light source. A light emission plane of the white surface light source is approximately parallel to the substrate 1, and the backlight module 400 emits light in a direct manner. The light mixing member 4 is located on a surface of the optical conversion layer 3 or embedded into the optical conversion layer 3. An implementation in which the light mixing member 4 is located on the surface of the optical conversion layer 3 is shown in FIG. 6 to FIG. 8, and an implementation in which the light mixing member 4 is embedded into the optical conversion layer 3 is shown in FIG. 4 and FIG. 5. The light mixing member 4 is configured to mix the light.

In this embodiment, the optical conversion layer 3 of the backlight module 400 covers all of the plurality of spot light sources 2, to convert the light of the plurality of spot light sources 2 into the white surface light source. The light mixing member 4 having a light mixing function is disposed on the surface of the optical conversion layer 3 or embedded into the optical conversion layer 3, to cooperate with the optical conversion layer 3 to improve light emission evenness of the white surface light source. Therefore, the backlight module 400 evenly emits light, and a light mixing height that is required in an existing direct-type backlight source does not need to be reserved. Therefore, the backlight module 400 has a relatively small thickness, and the backlight module 400 can be applied to the display screen 200 and the terminal 100 that have relatively high requirements on lightness and thinness. The backlight module 400 uses direct light emission and can provide a highly even surface light source. Therefore, the display screen 200 and the terminal 100 to which the backlight module 400 is applied can implement full-screen display, and have a high contrast (HDR). In addition, the plurality of spot light sources 2 may be controlled using a control circuit and a control algorithm, to reduce power consumption, thereby prolonging a battery life.

Optionally, with reference to FIG. 2 to FIG. 4, the plurality of spot light sources 2 are electrically connected to the substrate 1. The substrate 1 may be a printed circuit board, and the substrate 1 supplies power to the plurality of spot light sources 2. In an implementation, the plurality of spot light sources 2 are controlled independently using a circuit on the substrate 1, such that a working mode in which some spot light sources are lit or a working mode in which all the spot light sources are lit may be selected. This achieves diversified display and can reduce power consumption, thereby prolonging battery life of the backlight module 400 and the display screen 200 and the terminal 100 to which the backlight module 400 is applied. In an implementation, as shown in FIG. 2, the substrate 1 is a rigid substrate, and the backlight module 400 provides a planar surface light source. In an implementation, as shown in FIG. 3, the substrate 1 may be a flexible substrate. For example, the substrate 1 may be a flexible printed circuit (FPC) board. Assembly and mold pressing on the flexible printed circuit board may be implemented by jig design, device modification, and technical parameter adjustment, such that the backlight module 400 provides a curved surface light source and the display screen 200 may be a curved display screen 200.

Optionally, with reference to FIG. 9 to FIG. 12, an LED chip is used as the spot light source 2. A length of a single LED chip is within a range of 0.005 mm to 0.2 mm, a width of the LED chip is within a range of 0.005 mm to 1 mm, and a thickness of the LED chip is within a range of 0.001 mm to 0.2 mm. The LED chip is any one of a blue light chip, a green light chip, a red light chip, or a near-ultraviolet light chip. The plurality of spot light sources 2 are approximately arranged as a matrix on the substrate 1. An onboard layout pitch between the plurality of spot light sources 2 on the substrate 1 is within a range of 0.01 mm to 3 mm. A thickness of the substrate 1 is within a range of 0.01 mm to 0.4 mm. The plurality of spot light sources 2 are all welded onto the substrate 1 using an SMT and DA or a mass transfer technology, to reduce costs.

In an embodiment, the substrate 1 includes a white base material 11, a white ink layer 12, and a plurality of pads 13. The white ink layer 12 covers the white base material 11. The plurality of pads 13 are fastened onto the white base material 11. The white ink layer 12 has a plurality of hollowed areas, which are used to expose the plurality of pads 13. Pins 21 of the plurality of spot light sources 2 are correspondingly welded onto the plurality of pads 13.

In an optional embodiment, with reference to FIG. 4 to FIG. 8, the light mixing member 4 according to this application has a plurality of implementations. The light mixing member 4 in the backlight module 400 may use only one of the implementations or a combination of a plurality of the implementations, to improve a light mixing effect. The light mixing member 4 may have the following several implementations.

FIG. 2 to FIG. 4 show a first implementation of the light mixing member 4.

The light mixing member 4 includes a plurality of diffusion powders 41. The plurality of diffusion powders 41 are distributed in the optical conversion layer 3. The diffusion powders 41 are used to break up and atomize light, to implement light diffusion and mixing. The diffusion powders 41 are chemical powers with a particle size ranging from 50 nm to 100 μm. A mixing proportion of the diffusion powders 41 in the optical conversion layer 3 is 0-50%.

In the first implementation, the plurality of diffusion powders 41 are distributed in the optical conversion layer 3. Therefore, the light mixing member 4 does not need to occupy thickness space of the backlight module 400. This is favorable for lightness and thinness of the backlight module 400, the display screen 200, and the terminal 100. In addition, the light mixing member 4 may be formed while the optical conversion layer 3 is formed. This simplifies a procedure for fabricating the backlight module 400, reducing fabrication costs of the backlight module 400.

FIG. 5 and FIG. 6 respectively show a second implementation and a third implementation of the light mixing member 4.

The light mixing member 4 includes a plurality of membranes 42. The plurality of membranes 42 are configured to transmit some light and reflect the other light. The plurality of membranes 42 are thin film structures having transmission and reflection functions. The plurality of membranes 42 are embedded into the optical conversion layer 3 or located on a surface that is of the optical conversion layer 3 and that is away from the substrate 1. The plurality of membranes 42 are aligned with the plurality of spot light sources 2 in a one-to-one correspondence. That is, the plurality of membranes 42 are located right above the plurality of spot light sources 2 in a one-to-one correspondence.

The second implementation of the light mixing member 4 is as follows. The plurality of membranes 42 may be in contact with both the plurality of spot light sources 2 and the optical conversion layer 3. For example, as shown in FIG. 5, the plurality of membranes 42 are laminated onto upper surfaces of the plurality of spot light sources 2 in a one-to-one correspondence. In this case, the optical conversion layer 3 encloses both the plurality of spot light sources 2 and the plurality of membranes 42. The third implementation of the light mixing member 4 is as follows. The plurality of membranes 42 are completely enclosed by the optical conversion layer 3, or located on a surface that is of the optical conversion layer 3 and that is away from the substrate 1 (as shown in FIG. 6). In this case, the plurality of membranes 42 are not in contact with the spot light source 2, and the plurality of membranes 42 and the plurality of spot light sources 2 are disposed in a spaced manner. It can be understood that when the optical conversion layer 3 includes a plurality of film layers that are stacked, and when the plurality of membranes 42 are located between two film layers of the plurality of film layers, the plurality of membranes 42 are completely enclosed by the optical conversion layer 3.

In the second implementation and the third implementation of the light mixing member 4, the plurality of membranes 42 are aligned with the plurality of spot light sources 2, and the membranes 42 have transmission and reflection functions. Therefore, the plurality of membranes 42 can reduce luminance in a central area of the plurality of spot light sources 2, thereby achieving a light mixing effect.

Optionally, a size of the membrane 42 is set based on a distance between the membrane 42 and the spot light source 2 and a light emission angle of the spot light source 2 by considering both a light mixing effect and overall light emission luminance of the backlight module 400. When the membrane 42 is close to the spot light source 2, the size of the membrane 42 is relatively small, or when the membrane 42 is far away from the spot light source 2, the size of the membrane is relatively large. For example, when the membrane 42 is in contact with the upper surface of the spot light source 2 (that is, away from a surface of the substrate 1), the size of the membrane 42 is smaller than a size of the upper surface of the spot light source 2, or when the membrane 42 is located on an upper surface that is of the optical conversion layer 3 and that is away from the spot light source 2, the size of the membrane 42 is greater than a size of the upper surface (that is, a surface away from the substrate 1) of the spot light source 2.

A shape of the membrane 42 may be determined according to an optical design. For example, the shape may be a circle or a square. A material of the membrane 42 may be an amorphous membrane of titanic oxide or silicon oxide, may be distributed as particles in a solvent, may be a thin layer coated with metal such as aluminum, copper, or silver, may be a photonic crystal-related material such as a DBR or an ESR, may be optical glue or a white ink layer with a high refractive index, or the like. A thickness of the membrane 42 is within a range of 0.1 µm to 50 µm. Certainly, the membrane 42 may alternatively be set to another thickness based on an optical design requirement. A transmittance and a reflectivity of the membrane 42 are designed based on a light mixing requirement. A size of the membrane 42 is adjusted based on the light mixing requirement and the transmittance and the reflectivity.

Optionally, in a direction perpendicular to the substrate 1, a plurality of membranes 42 may be arranged above a single spot light source 2 in a spaced manner, to implement a plurality of times of reflection and a plurality of times of transmission. This further reduces luminance in a central area right above the spot light source 2, thereby achieving even light mixing. In this case, the backlight module 400 can still ensure even light emission while using the spot light source 2 having higher power and higher luminance.

FIG. 7 and FIG. 13A to FIG. 13C show a fourth implementation of the light mixing member 4.

The light mixing member 4 includes a plurality of micro structural blocks 43, and the plurality of micro structural blocks 43 are configured to perform optical diffusion on light. The plurality of micro structural blocks 43 are embedded into the optical conversion layer 3 or located on a surface that is of the optical conversion layer 3 and that is away from the substrate 1. The plurality of micro structural blocks 43 are configured to perform optical diffusion on passing light, to achieve a light mixing effect. The plurality of micro structural blocks 43 may be a plurality of mutually spaced lens blocks, or may be an integrated lens in a special shape.

Optionally, a related surface shape of the micro structural block 43 may be implemented through imprinting, etching, diamond cutting, or the like. The surface shape may be a sphere, a hemisphere, or an ellipsoid shown in FIG. 13A, a cylinder or a cuboid shown in FIG. 13B, or a prism shape or a prism column shape shown in FIG. 13C.

FIG. 8 shows a fifth implementation of the light mixing member 4.

The light mixing member 4 includes a reflective film 44. The reflective film 44 is provided with a plurality of hollowed areas. The reflective film 44 is located on a surface of the optical conversion layer 3 facing the substrate 1. The reflective film 44 is in contact with the substrate 1, and the plurality of spot light sources 2 are located in the plurality of hollowed areas in a one-to-one correspondence. The reflective film 44 may be made of a membrane material having a high reflectivity, for example, DBR or ESR. A reflectivity of the reflective film 44 is greater than or equal to 80%. A thickness of the reflective film 44 is from 0.01 mm to 0.1 mm. The reflective film 44 improves light utilization while implementing light mixing, thereby ensuring optical efficiency of the plurality of spot light sources 2 and reducing power consumption of the backlight module 400.

With reference to FIG. 4 to FIG. 8 and FIG. 14 to FIG. 16, in an optional embodiment, the optical conversion layer 3 according to this application has a plurality of implementations, and the backlight module 400 may use any one of the implementations. The optical conversion layer 3 may have the following several implementations.

FIG. 4 to FIG. 8 show a first implementation of the optical conversion layer 3.

The optical conversion layer 3 includes a base material 311, and a phosphor and/or quantum dots 312 distributed in the base material 311. That is, the optical conversion layer 3 includes the phosphor, or the optical conversion layer 3 includes the quantum dots, or the optical conversion layer 3 includes the phosphor and the quantum dots. In this embodiment of this application, "X and/or Y" includes three solutions in total: an "X" solution, a "Y" solution, and an "X and Y" solution. The optical conversion layer 3 is in contact with the substrate 1 and encloses the plurality of spot light sources 2. The phosphor or the quantum dots 312 are configured to convert, into white light, the light emitted by the plurality of spot light sources 2. For example, when the plurality of spot light sources 2 emit blue light, the phosphor or the quantum dots 312 can convert the blue light into green light and red light, which are finally mixed to obtain white light.

Optionally, in the direction perpendicular to the substrate 1, a thickness of the optical conversion layer 3 is greater than a thickness of the plurality of spot light sources 2. The thickness of the optical conversion layer 3 is within a range of 0.1 mm to 0.6 mm.

The phosphor 312 in the base material 311 is in a form of a compound, and may include but is not limited to a red-light phosphor (one or more of oxynitride, fluoride, and nitride), a green-light phosphor (one or both of sialon and silicate), a yellow powder (one or both of yttrium aluminium garnet and silicate), and a blue powder (one or both of barium aluminate and aluminate). The base material 311 may be optical silica gel or an UV glue material. The optical silica gel may include but is not limited to organic silica gel and inorganic silica gel. The organic silica gel includes a compound of one or more of silicone rubber, silicone resin, and silicone oil. The inorganic silica gel includes a compound of one or more of type B silica gel, coarse-porous silica gel, and fine-porous silica gel.

A particle size of the phosphor in the base material 311 ranges from 2 μm to 50 μm. A particle size of the quantum dots in the base material 311 ranges from 2 nm to 100 nm. A mixing proportion of the phosphor and or the quantum dots in the base material 311 is 2-80%. A single type of phosphor and/or quantum dots may be mixed, or a plurality of types of phosphor and/or quantum dots may be mixed. The diffusion powders 41 may be distributed in the optical conversion layer 3, to improve the light mixing effect.

Figure 14:
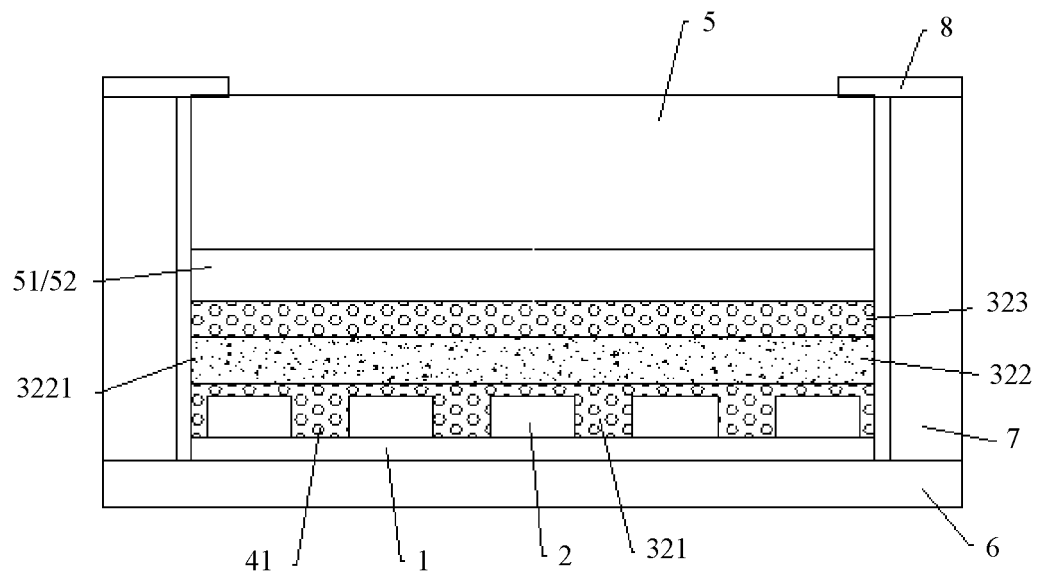
FIG. 14 is a schematic structural diagram of a sixth implementation of a backlight module in the display screen shown in FIG. 2.

FIG. 14 shows a second implementation of the optical conversion layer 3.

The optical conversion layer 3 includes a packaging layer 321 and a conversion layer 322. The packaging layer 321 is made of a transparent material. For example, the packaging layer 321 may be made of optical silica gel or an ultraviolet-cured glue material. A thickness of the packaging layer 321 is greater than a thickness of the plurality of spot light sources 2. The packaging layer 321 is in contact with the substrate 1 and encloses the plurality of spot light sources 2. That is, the packaging layer 321 packages the plurality of spot light sources 2. The conversion layer 322 includes a phosphor and/or quantum dots 3221. A membrane material of the conversion layer 322 is optical silica gel or an ultraviolet-cured glue material. The phosphor and/or the quantum dots 3221 are evenly distributed in the membrane material of the conversion layer 322. The conversion layer 322 covers a side that is of the packaging layer 321 and that is away from the substrate 1. The conversion layer 322 is separated from the plurality of spot light sources 2 by the packaging layer 321. This can effectively prevent the phosphor 3221 in a fluorescent layer of the conversion layer 322 from coming into direct contact with the plurality of spot light sources 2 at a high temperature, to prevent the phosphor 3221 from being exhausted due to heat, thereby prolonging a service life of the backlight module 400.

Optionally, the optical conversion layer 3 further includes a protection layer 323. The protection layer 323 is located on a side that is of the conversion layer 322 and that is away from the packaging layer 321. The protection layer 323 may be made of optical silica gel or an ultraviolet-cured glue material, to form a transparent adhesive layer. The protection layer 323 may be formed through mold pressing.

Optionally, the conversion layer 322 is formed, through coating, spaying, or mold pressing, on a surface that is of the packaging layer 321 and that is away from the substrate 1. The surface that is of the packaging layer 321 and that is away from the substrate 1 may be a flat plane, such that the conversion layer 322 is formed on the packaging layer 321 with better quality. Alternatively, the conversion layer 322 is an optical conversion membrane. The optical conversion membrane is bonded, using optical clear adhesive, to the surface that is of the packaging layer 321 and that is away from the substrate 1, or the optical conversion membrane is fastened, through spaced mounting, onto the surface that is of the packaging layer 321 and that is away from the substrate 1. The diffusion powders 41 may be distributed in the packaging layer 321 and/or the protection layer 323, to achieve the light mixing effect.

Figure 15:
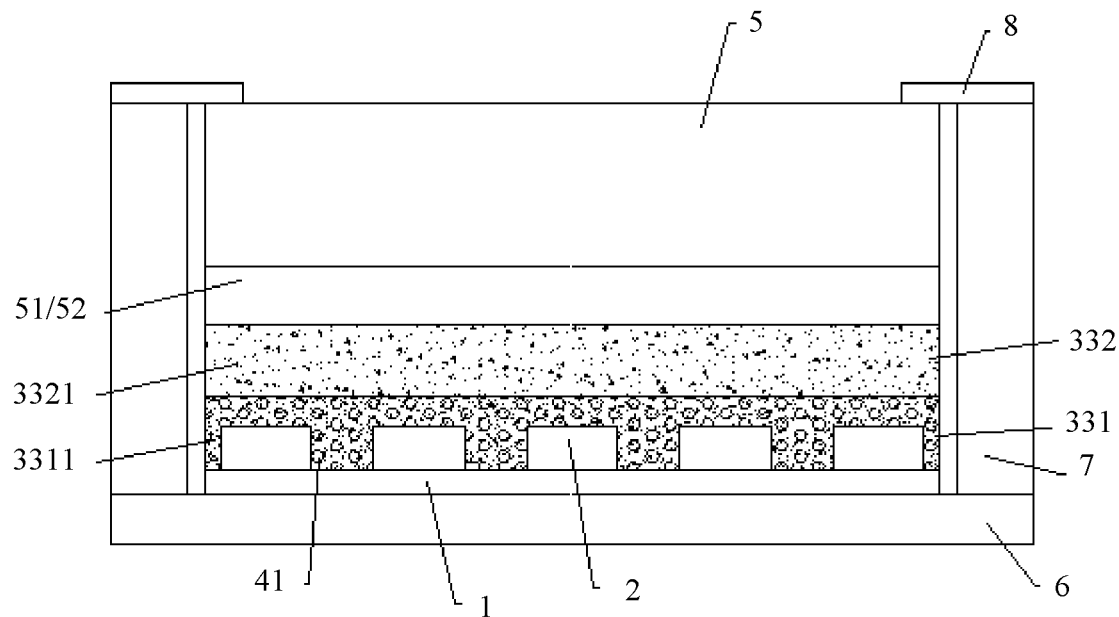
FIG. 15 is a schematic structural diagram of a seventh implementation of a backlight module in the display screen shown in FIG. 2.

FIG. 15 shows a third implementation of the optical conversion layer 3.

The optical conversion layer 3 includes a first conversion sublayer 331 and a second conversion sublayer 332. The first conversion sublayer 331 includes a first phosphor 3311. A membrane material of the first conversion sublayer 331 is optical silica gel or an ultraviolet-cured glue material. The first phosphor 3311 is evenly distributed in the membrane material of the first conversion sublayer 331. The first conversion sublayer 331 is in contact with the substrate 1 and encloses the plurality of spot light sources 2. A thickness of the first conversion sublayer 331 is greater than the thickness of the plurality of spot light sources 2. The second conversion sublayer 332 includes a second phosphor 3321. A membrane material of the second conversion sublayer 332 is optical silica gel or an ultraviolet-cured glue material. The second phosphor 3321 is evenly distributed in the membrane material of the second conversion sublayer 332. The second conversion sublayer 332 covers a side that is of the first conversion sublayer 331 and that is away from the substrate 1. The first phosphor 3311 and the second phosphor 3321 cooperate with each other to convert the light from the plurality of spot light sources 2 into white light. For example, the first phosphor 3311 is green phosphor, and the second phosphor 3321 is red phosphor, or the first phosphor 3311 is red phosphor, and the second phosphor 3321 is green phosphor.

Optionally, the second conversion sublayer 332 is formed, through coating, spaying, or mold pressing, on a surface that is of the first conversion sublayer 331 and that is away from the substrate 1. The surface that is of the first conversion sublayer 331 and that is away from the substrate 1 may be a flat plane, such that the second conversion sublayer 322 is formed on the first conversion sublayer 331 with better quality. Alternatively, the second conversion sublayer 332 is an optical conversion membrane. The optical conversion membrane is bonded, using optical clear adhesive, to the surface that is of the first conversion sublayer 331 and that is away from the substrate 1, or the optical conversion membrane is fastened, through spaced mounting, onto the surface that is of the first conversion sublayer 331 and that is away from the substrate 1. The diffusion powders 41 may be distributed in the first conversion sublayer 331 and/or the second conversion sublayer 332.

Figure 16:
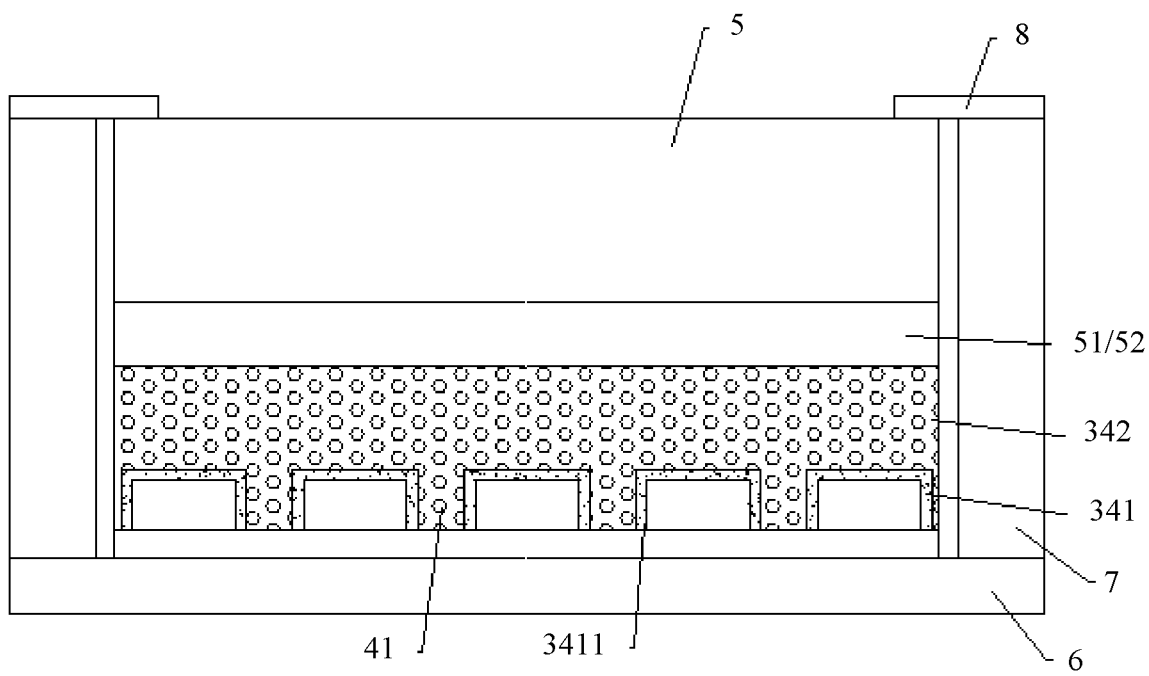
FIG. 16 is a schematic structural diagram of an eighth implementation of a backlight module in the display screen shown in FIG. 2.

FIG. 16 shows a fourth implementation of the optical conversion layer 3.

The optical conversion layer 3 includes a plurality of conversion thin films 341 and a packaging element 342. The plurality of conversion thin films 341 include a phosphor and/or quantum dots 3411. A membrane material of the conversion thin film 341 is optical silica gel or an ultraviolet-cured glue material. The phosphor and/or the quantum dots 3411 are evenly distributed in the membrane material of the conversion thin film 341. The plurality of conversion thin films 341 enclose the plurality of spot light sources 2 in a one-to-one correspondence. The plurality of conversion thin films 341 may be formed on surfaces of the plurality of spot light sources 2 through spraying or by performing mold pressing on the membrane material in a vacuum. The packaging element 342 is made of a transparent material. For example, the packaging element 342 may be made of optical silica gel or an ultraviolet-cured glue material. The packaging element 342 is in contact with the substrate 1 and encloses the plurality of conversion thin films 341. The packaging element 342 may be formed through mold pressing. A thickness of the packaging element 342 is greater than a thickness of the plurality of spot light sources 2. A thickness of the conversion thin film 341 is within a range of 0.01 mm to 0.2 mm. The diffusion powders 41 may be distributed in the conversion thin films 341 and/or the packaging element 342, to improve the light mixing effect.

Optionally, a protection film layer may be further disposed on the upper surface that is of the optical conversion layer 3 and that is away from the substrate. The protection film layer may be made of optical silica gel or an ultraviolet-cured glue material, to form a transparent adhesive layer. The diffusion powders 41 may be distributed in the protection film layer, to improve the light mixing effect. The protection film layer may be shaped through mold pressing.

With reference to FIG. 2 to FIG. 8 and FIG. 14 to FIG. 16, in an optional embodiment, the backlight module 400 further includes an optical membrane assembly 5. The optical membrane assembly 5 is located on a side that is of the optical conversion layer 3 and that is away from the substrate 1. The optical membrane assembly 5 is configured to mix and brighten passing light. The light emitted by the plurality of spot light sources 2 is mixed for a first time by the light mixing member 4, and mixed for a second time by the optical membrane assembly 5, thereby achieving better light emission evenness for the backlight module 400. An overall thickness of the backlight module 400 according to this application is within a range of 0.4 mm to 2 mm. This is favorable for implementing lightness and thinness of the display screen 200 and the terminal 100.

Optionally, the optical membrane assembly 5 is bonded to the optical conversion layer 3 using a bonding layer 51. The bonding layer 51 fastens the optical membrane assembly 5 and the optical conversion layer 3 together, and a connection relationship is reliable. The bonding layer 51 may include diffusion particles. A proportion of the diffusion particles is within a range of 0-50%, to meet both a transparency requirement and a light mixing requirement. A diameter of the diffusion particles added into the bonding layer 51 is within a range of 50 nm to 100 μm. A material of the diffusion particles includes but is not limited to PMMA, silicon dioxide, metal ions, and the like. A difference between a refractive index of scattering particles and a refractive index of adhesive of the bonding layer 51 is within a range of 0.1 to 0.5. After the diffusion particles are added, a light transmittance of the bonding layer 51 is greater than 50%. Adhesive of the bonding layer 51 may be fluid, and formed through slit coating or spraying. Alternatively, adhesive of the bonding layer 51 may be a plate viscoelastic body. Certainly, in another implementation, there may be no diffusion particles in the bonding layer 51.

Optionally, the backlight module 400 further includes a backplane 6, a plastic frame 7, and square-shaped adhesive 8. The plastic frame 7 is connected around the backplane 6, to jointly encircle an accommodation space 40. The substrate 1, the optical conversion layer 3, and the optical membrane assembly 5 are all accommodated in the accommodation space 40. The square-shaped adhesive 8 bonds the optical membrane assembly 5 and the plastic frame 7. In this case, the optical membrane assembly 5 is mounted on the optical conversion layer 3 in a spaced manner, and there is an air gap 52 between the optical membrane assembly 5 and the optical conversion layer 3.

Optionally, as shown in FIG. 4, the optical membrane assembly 5 includes a plurality of light mixing thin films 53. The light mixing thin films 53 are configured to transmit some light and reflect the other light. The plurality of light mixing thin films 53 are located on a surface of the optical membrane assembly 5 facing the optical conversion layer. The plurality of light mixing thin films 53 are aligned with the plurality of spot light sources 2 in a one-to-one correspondence. That is, the plurality of light mixing thin films 53 are located right above the plurality of spot light sources 2 in a one-to-one correspondence. The plurality of light mixing thin films 53 can further reduce the luminance in the central area of the plurality of spot light sources 2, to achieve the light mixing effect, thereby achieving better light emission evenness for the backlight module 400. The plurality of light mixing thin films 53 and the plurality of membranes 42 may use same or similar materials and have same or similar structures.

In an implementation, as shown in FIG. 4, the optical membrane assembly 5 includes a first prism film 54, a diffusion film 55, and a second prism film 56 that are stacked in sequence. The first prism film 54 is located between the optical conversion layer 3 and the diffusion film 55, and the first prism film 54 and the second prism film 56 cooperate with each other to brighten passing light. In this case, the plurality of light mixing thin films 53 are located on a side of the first prism film 54 facing the optical conversion layer 3.

The diffusion film 55 is configured to provide an even surface light source for the backlight module 400. A material having a high light transmittance, for example, PET/PC/PMMA, needs to be selected as a base material of the diffusion film 55. The diffusion film 55 is mainly made by adding chemical grains as scattering particles into the base material of the diffusion film 55. However, in an existing diffusion board, micro-particles are distributed between resin layers. As a result, when passing through the diffusion film 55, light constantly passes through two media having different refractive indexes. In this process, the light is refracted, reflected, and scattered, resulting in an optical diffusion effect. The diffusion film 55 includes an antistatic coating layer, a PET base material, and a diffusion layer that are stacked in sequence in a light emission direction. The diffusion film 55 may be a scattered particle-type diffusion film, a bulk diffusion film, or the like.

The first prism film 54 and the second prism film 56 each are a transparent plastic thin film with a thickness ranging from 50 μm to 300 μm. A layer of prism structure is overlaid evenly and neatly on an upper surface of the thin film. The first prism film 54 and the second prism film 56 are configured to improve angular distribution of light, such that diverged light is converged to an axial angle, that is, a front view angle. This improves axial luminance without increasing an overall emergent luminous flux, thereby implementing brightening. A membrane material of the first prism film 54 and the second prism film 56 each may be a single-layer prism film or a double-layer bonding prism film (an angle between the two layers may be changed as required). A prism shape may be a regular strip prism, a pyramid, a frustum, a cone, or the like. Prism patterns may use different parameters, for example, different angles (for example, vertex angles of 30° to 60°), a cycle is changed as required, or the like.

Optionally, the first prism film 54 and the diffusion film 55 are bonded using a transparent bonding layer 57, and the diffusion film 55 and the first prism film 54 are bonded using a transparent bonding layer 57. The transparent bonding layer 57 may be made of optical silica gel or an ultraviolet-cured glue material. Diffusion particles may be added into the transparent bonding layer 57 to enhance the light mixing effect. Adhesive of the transparent bonding layer 57 may be fluid, and formed through slit coating (Slit Coating) or spraying. Alternatively, adhesive of the transparent bonding layer 57 may be a plate viscoelastic body. Certainly, in another implementation, alternatively, the first prism film 54 and the diffusion film 55 may be fastened using adhesive in a periphery, and the diffusion film 55 and the first prism film 54 may be fastened using adhesive in a periphery, to implement spaced mounting. In this case, there is an air gap 58 between the first prism film 54 and the diffusion film 55, and there is an air gap 58 between the diffusion film 55 and the first prism film 54.

In another implementation, alternatively, a combination manner of the optical membrane assembly 5 may be: a diffusion film+a prism film, or a diffusion film+a prism film+a diffusion film+a prism film. A topmost layer that is of the optical membrane assembly 5 and that is away from the optical conversion layer 3 is a prism film. Film layers of the optical membrane assembly 5 are bonded to each other using a bonding material layer or fastened through spaced mounting.

It can be understood that, in this embodiment of this application, diffusion particles are added into each bonding material layer to enhance the light mixing effect. In this embodiment of this application, the bonding material layers include but are not limited to the optical clear adhesive, the bonding layer 51, the transparent bonding layer 57, and the like. A diameter of the diffusion particles is within a range of 50 nm to 100 μm. A mixing proportion of the diffusion particles is within a range of 0-50%. The diffusion particles and the diffusion powder 41 may be made of a same material and have a same size, to simplify material types of the backlight module 400, thereby reducing costs of the backlight module 400.

With reference to FIG. 4 to FIG. 17, in a specific embodiment, the first implementation to the fifth implementation of the light mixing member 4, the first implementation and the fourth implementation of the optical conversion layer 3, and the plurality of implementations of the optical membrane assembly 5 may be randomly combined.

The following describes a fabrication method with reference to the specific embodiments of the backlight module 400.

Step 001: Referring to FIG. 9 to FIG. 12 and FIG. 17, mount a plurality of spot light sources onto a substrate.

The substrate 1 is provided, the plurality of spot light sources 2 are fastened onto the substrate 1 according to a particular arrangement rule, and an electrical connection is established.

Step 002: Referring to FIG. 4 to FIG. 8 and FIG. 14 to FIG. 17, process an optical conversion layer and a light mixing member.

Solution 1: Referring to FIG. 4, for a combination of the first implementation of the light mixing member 4 and the first implementation of the optical conversion layer 3:

Provide a half-cured membrane or liquid adhesive that mainly includes optical silica gel or ultraviolet-cured glue and in which a phosphor 312 and a diffusion powder 41 are evenly mixed, place, at a mold fastening position of an injection molding device or a hot-pressing device, the substrate 1 to which the plurality of spot light sources 2 are assembled in step 1, and then overlay the half-cured membrane or the liquid adhesive above the substrate 1 or at a position corresponding to a mold, and then press-fit the membrane material onto the substrate 1 in through hot-pressing and vaccumization, to form the optical conversion layer 3 that completely encloses the plurality of spot light sources 2.

Solution 2: Referring to FIG. 14, for a combination of the first implementation of the light mixing member 4 and the second implementation of the optical conversion layer 3:

First step: Provide a half-cured membrane or liquid adhesive that mainly includes optical silica gel or ultraviolet-cured glue and in which a diffusion powder 41 is evenly mixed, place, at a mold fastening position of an injection molding device or a hot-pressing device, the substrate 1 to which the plurality of spot light sources 2 are assembled in step 1, and then overlay the half-cured membrane or the liquid adhesive above the substrate 1 or at a position corresponding to a mold, and then press-fit the membrane material onto the substrate 1 in through hot-pressing and vaccumization, to form a packaging layer 321 that completely encloses the plurality of spot light sources 2.

Second step: Form, by spraying, coating, or mold pressing, a conversion layer 322 on a surface that is of the packaging layer 321 and that is away from a surface of the substrate 1, or bond an optical conversion membrane using a transparent adhesive material (for example, optical clear adhesive) or mount an optical conversion membrane in a spaced manner.

Third step: Repeat step 1 to form a protection layer 323 on a surface that is of the conversion layer 322 and that is away from the packaging layer 321. (This step may be omitted.)

Solution 3: Referring to FIG. 15, for a combination of the first implementation of the light mixing member 4 and the third implementation of the optical conversion layer 3:

First step: Provide a half-cured membrane or liquid adhesive that mainly includes optical silica gel or ultraviolet-cured glue and in which a first phosphor 3311 and a diffusion powder 41 are evenly mixed, place, at a mold fastening position of an injection molding device or a hot-pressing device, the substrate 1 onto which the plurality of spot light sources 2 are assembled in step 1, and then overlay the half-cured membrane or the liquid adhesive above the substrate 1 or at a position corresponding to a mold, and then press-fit the membrane material onto the substrate 1 in through hot-pressing and vaccumization, to form a first conversion sublayer 331 that completely encloses the plurality of spot light sources 2.

Second step: Then, perform spaying, coating, or mold-pressing on a surface that is of the first conversion sublayer 331 and that is away from the substrate 1 to form a second conversion sublayer 332 that has a second phosphor 3321 and that matches the first step, bond, to a surface that is of the first conversion sublayer 331 and that is away from the substrate 1 using a transparent adhesive material, a second conversion sublayer 332 that has a second phosphor 3321 and that matches the first step, or mount, in a spaced manner to a surface that is of the first conversion sublayer 331 and that is away from the substrate 1, a second conversion sublayer 332 that has a second phosphor 3321 and that matches the first step.

Solution 4: Referring to FIG. 16, for a combination of the first implementation of the light mixing member 4 and the fourth implementation of the optical conversion layer 3:

First step: Provide a half-cured membrane that mainly includes optical silica gel or ultraviolet-cured glue and in which a phosphor is evenly mixed, place, at a mold fastening position of a vacuum heating device, the substrate 1 onto which the plurality of spot light sources 2 are assembled in step 1, and then overlay the half-cured membrane at a corresponding position on a surface of the substrate 1, and then attach the membrane material onto the substrate 1 through vaccumization and heating, to form a plurality of conversion thin films 341 that completely encloses the plurality of spot light sources 2.

Second step: Provide a half-cured membrane or liquid adhesive that mainly includes optical silica gel or ultraviolet-cured glue and in which a diffusion powder 41 is evenly mixed, place, at a mold fastening position of an injection molding device or a hot-pressing device, the substrate 1 on which the first step is completed, and then overlay the half-cured membrane or the liquid adhesive above the substrate 1 or at a position corresponding to a mold, and then press-fit the membrane material onto the substrate 1 in through hot-pressing and vaccumization, to form a packaging element 342 that completely encloses the plurality of conversion thin films 341.

Solution 5: Referring to FIG. 5 and FIG. 14 to FIG. 16, for a combination of the second implementation of the light mixing member 4 and the first implementation of the optical conversion layer 3:

First step: Provide a material having both transmission and reflection functions, form a thin film on upper surfaces of the plurality of spot light sources 2 through spraying, coating, printing, or the like, and form a plurality of membranes 42 by heating and baking or by UV curing.

Second step: Same as the step in solution 1 to solution 4.

Solution 6: Referring to FIG. 6, for a combination of the third implementation of the light mixing member 4 and the first implementation of the optical conversion layer 3:

First step: Same as the step in solution 1.

Second step: Provide a material having both transmission and reflection functions, design a particular opening using a mask, form a thin film on a surface of the optical conversion layer 3 using a spraying or coating technology or using a metal stencil printing or silk-screen printing technology, and form a plurality of membranes 42 by heating and baking or by ultraviolet curing.

Solution 7: Referring to FIG. 6 and FIG. 14, for a combination of the third implementation of the light mixing member 4 and the second implementation of the optical conversion layer 3:

On a basis of the steps in solution 2, the following step is added after the first step, the second step, or the third step in solution 2: providing a material having both transmission and reflection functions, designing a particular opening using a mask, forming a thin film on a surface of the packaging layer 321, a surface of the conversion layer 322, or a surface of the protection layer 323 using a spraying or coating technology or using a metal stencil printing or silk-screen printing technology, and forming a plurality of membranes 42 by heating and baking or by ultraviolet curing. In this case, the plurality of membranes 42 are located between the packaging layer 321 and the conversion layer 322, between the conversion layer 322 and the protection layer 323, or on a side that is of the protection layer 323 and that is away from the conversion layer 322.

Solution 8: Referring to FIG. 6 and FIG. 15, for a combination of the third implementation of the light mixing member 4 and the third implementation of the optical conversion layer 3:

On a basis of the steps in solution 3, the following step is added after the first step or the second step in solution 3: providing a material having both transmission and reflection functions, designing a particular opening using a mask, forming a thin film on a surface of the first conversion sublayer 331 or a surface of the second conversion sublayer 332 using a spraying or coating technology or using a metal stencil printing or silk-screen printing technology, and forming a plurality of membranes 42 by heating and baking or by ultraviolet curing. In this case, the plurality of membranes 42 are formed between the first conversion sublayer 331 and the second conversion sublayer 332 or on a side that is of the second conversion sublayer 332 and that is away from the first conversion sublayer 331.

Solution 9: Referring to FIG. 6 and FIG. 16, for a combination of the third implementation of the light mixing member 4 and the fourth implementation of the optical conversion layer 3:

On a basis of the steps in solution 4, the following step is added after the first step or the second step is completed: providing a material having both transmission and reflection functions, designing a particular opening using a mask, forming a thin film on a surface of the plurality of conversion thin films 341 or a surface of the packaging element 342 using a spraying or coating technology or using a metal stencil printing or silk-screen printing technology, and forming a plurality of membranes 42 by heating and baking or by ultraviolet curing. In this case, the plurality of membranes 42 are formed between the conversion thin films 341 and the packaging element 342 or on a surface that is of the packaging element 342 and that is away from the conversion thin films 341.

Solution 10: Referring to FIG. 7, for a combination of the fourth implementation of the light mixing member 4 and the first implementation of the optical conversion layer 3:

First step: Same as the step in solution 1.

Second step: Form, on a surface of the optical conversion layer 3 through imprinting, etching, diamond cutting, or the like, a micro structural block 43 for optical diffusion.

Solution 11: Referring to FIG. 7 and FIG. 14, for a combination of the fourth implementation of the light mixing member 4 and the second implementation of the optical conversion layer 3:

On a basis of the steps in solution 2, the following step is added after the first step, the second step, or the third step is completed: forming, on a surface of the optical conversion layer 3 or a surface of a transparent film layer through imprinting, etching, diamond cutting, or the like, a micro structural block 43 for optical diffusion. In this case, the micro structural block 43 is located between the packaging layer 321 and the conversion layer 322, between the conversion layer 322 and the protection layer 323, or on a side that is of the protection layer 323 and that is away from the conversion layer 322.

Solution 12: Referring to FIG. 7 and FIG. 15, for a combination of the fourth implementation of the light mixing member 4 and the third implementation of the optical conversion layer 3:

On a basis of the steps in solution 3, the following step is added after the first step or the second step is completed: forming, on a surface of a green phosphor layer or a surface of a red phosphor layer through imprinting, etching, diamond cutting, or the like, a layer of micro structural block 43 for optical diffusion. In this case, the micro structural block 43 is formed between the first conversion sublayer 331 and the second conversion sublayer 332 or on a side that is of the second conversion sublayer 332 and that is away from the first conversion sublayer 331.

Solution 13: Referring to FIG. 7 and FIG. 16, for a combination of the fourth implementation of the light mixing member 4 and the fourth implementation of the optical conversion layer 3:

On a basis of the steps in solution 4, the following step is added after the first step or the second step is completed: forming, on a surface of the optical conversion layer 3 or a surface of a transparent film layer through imprinting, etching, diamond cutting, or the like, a layer of micro structural block 43 for optical diffusion. In this case, the micro structural block 43 is formed between the conversion thin films 341 and the packaging element 342 or on a surface that is of the packaging element 342 and that is away from the conversion thin films 341.

Solution 14: Referring to FIG. 8 and FIG. 14 to FIG. 16, for a combination of the fifth implementation of the light mixing member 4 and the first implementation to the fourth implementation of the optical conversion layer 3:

First: Provide a layer of reflective film 44 having a high reflectivity, and fasten, through adhesive bonding or partial fastening, the reflective film 44 onto the substrate 1 on which step 1 is completed, where locations on the reflective film 44 that correspond to the plurality of spot light sources 2 are hollowed out for avoidance.

Second step: Same as the step in solution 1 to solution 4.

Figure 17:
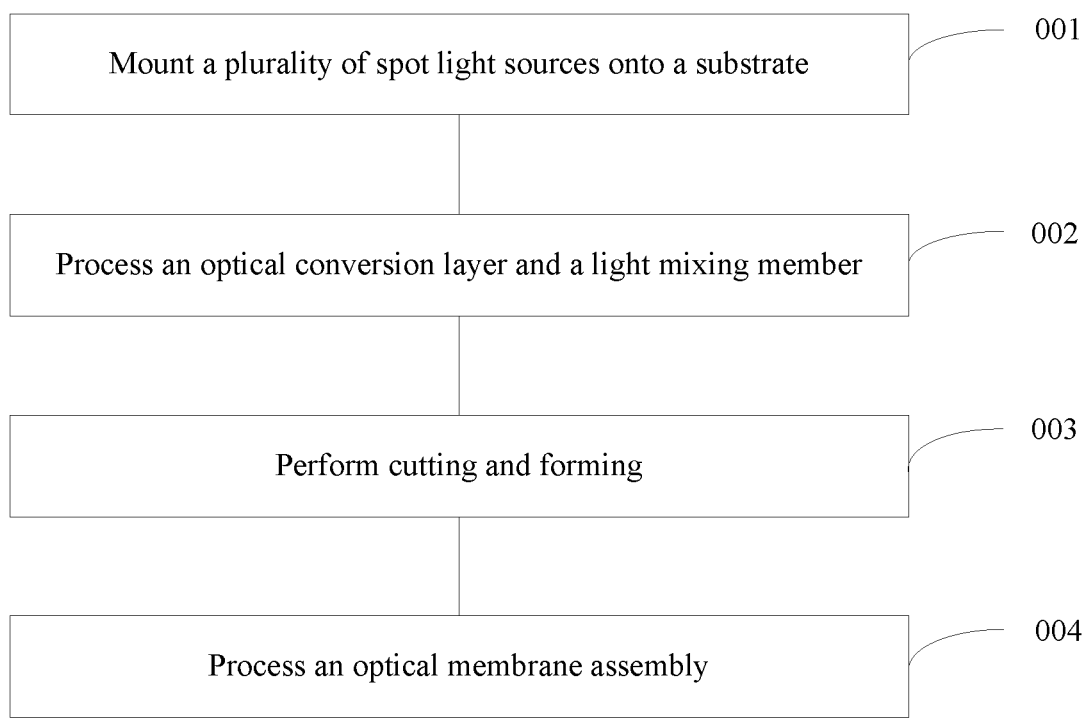
FIG. 17 is a flowchart of a backlight module fabrication method according to an embodiment of this application.

Step 003: Referring to FIG. 17, perform cutting and forming.

Cutting and molding are performed on a semi-finished product of the processed optical conversion layer 3 and the light mixing member 4 through laser cutting, mechanical cutting, or stamping, to form a surface light source component having a required product appearance.

Step 004: Referring to FIG. 4 to FIG. 8 and FIG. 14 to FIG. 17, process an optical membrane assembly.

(1) The optical membrane assembly 5 is an integrated membrane material, and the membrane material is connected to the optical conversion layer 3 using a transparent adhesive material.

First step: Provide a transparent bonding material, and use a lamination device to bond one side of the bonding material to an obverse side of the surface light source component on which step 3 is completed.

Second step: Use the lamination device to bond an entire membrane material of the optical membrane assembly 5 to a surface of the bonding material.

(2) The optical membrane assembly 5 is an integrated membrane material, and the membrane material and the optical conversion layer 3 are mounted, in manner in which a periphery is fastened, with an air gap between the membrane material and the optical conversion layer 3.

First step: Provide a plastic frame 7 and a backplane 6, and use a lamination device to fasten a back side of the surface light source component on which step 3 is completed onto the backplane 6 using adhesive.

Second step: Use the lamination device to place the entire membrane material of the optical membrane assembly 5 onto an obverse side of the surface light source component.

Third step: Provide square-shaped adhesive 8, and use the lamination device to bond and fasten the membrane material of the optical membrane assembly 5 and the plastic frame 7 at a periphery of the plastic frame 7.

(3) The optical membrane assembly 5 is separated membrane materials and is mounted with an air gap between the membrane materials. The membrane material is connected to the optical conversion layer 3 using a transparent adhesive material.

First step: Provide a transparent bonding material, and use a lamination device to bond one side of the bonding material to an obverse side of the surface light source component on which step 3 is completed.

Second step: Use the lamination device to laminate a prism film or a diffusion film 55 at a bottom layer of the membrane materials of the optical membrane assembly 5 onto a surface of the bonding material.

Third step: Provide a plastic frame 7 and a backplane 6, and use a lamination device to fasten a back side of the surface light source component on which the second step is completed onto the backplane 6 using adhesive.

Fourth step: Use the lamination device to place other membranes 42 in sequence onto the obverse side of the surface light source component.

Fifth step: Provide square-shaped adhesive 8, and use the lamination device to bond and fasten the membranes 42 of the optical membrane assembly 5 and the plastic frame 7 at a periphery of the plastic frame 7.

(4) The optical membrane assembly 5 is separated membrane materials and is mounted with an air gap between the membrane materials. The membrane materials and the optical conversion layer 3 are mounted, in manner in which a periphery is fastened, with an air gap between the membrane materials and the optical conversion layer 3.

First step: Provide a plastic frame 7 and a backplane 6, and use a lamination device to fasten a back side of the surface light source component on which the second step is completed onto the backplane 6 using adhesive.

Second step: Use the lamination device to place membranes 42 of the optical membrane assembly 5 in sequence onto an obverse side of the surface light source component.

Third step: Provide square-shaped adhesive 8, and use the lamination device to bond and fasten the membranes 42 of the optical membrane assembly 5 and the plastic frame 7 at a periphery of the plastic frame 7.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A backlight system comprising:
a substrate;
a plurality of spot light sources fastened onto the substrate and configured to emit light;
an optical conversion layer stacked on the substrate, configured to cover the spot light sources and convert the light into a white surface light source, and comprising:
a packaging layer made of a transparent material, wherein the packaging layer is in contact with the substrate and configured to enclose the spot light sources; and
a conversion layer configured to cover a side of the packaging layer that is away from the substrate; and a light mixing member located on a surface of the optical conversion layer or embedded into the optical conversion layer,
wherein the light mixing member is configured to mix the light.

2. The backlight system of claim 1, wherein the light mixing member comprises a plurality of diffusion powders, and wherein the diffusion powders are distributed in the optical conversion layer.

3. The backlight system of claim 1, wherein the light mixing member comprises a plurality of membranes, wherein the membranes are configured to transmit a first portion of the light and reflect a second portion of the light, wherein the membranes are embedded into the optical conversion layer or located on a surface of the optical conversion layer that faces away from the substrate, and wherein the membranes are aligned with the spot light sources in a one-to-one correspondence.

4. The backlight system of claim 1, wherein the light mixing member comprises a plurality of micro structural blocks configured to perform optical diffusion on the light, and wherein the micro structural blocks are embedded into the optical conversion layer or located on a surface of the optical conversion layer that faces away from the substrate.

5. The backlight system of claim 1, wherein the light mixing member comprises a reflective film located on a surface of the optical conversion layer that faces the substrate, wherein the reflective film is in contact with the substrate, wherein the reflective film is provided with a plurality of hollowed areas, and wherein the spot light sources are located in the hollowed areas in a one-to-one correspondence.

6. The backlight system of claim 1, further comprising an optical membrane assembly located on a side of the optical conversion layer that is away from the substrate and configured to mix and brighten the light.

7. The backlight system of claim 6, wherein the optical membrane assembly is configured to bond to the optical conversion layer using a bonding layer.

8. The backlight system of claim 7, wherein the bonding layer comprises diffusion particles, and wherein a mixing proportion of the diffusion particles is within a range of 0-50%.

9. The backlight system of claim 6, further comprising:
a backplane;
a plastic frame coupled around the backplane to jointly encircle an accommodation space, wherein the substrate, the optical conversion layer, and the optical membrane assembly are accommodated in the accommodation space; and
a square-shaped adhesive configured to bond the optical membrane assembly and the plastic frame.

10. The backlight system of claim 6, wherein the optical membrane assembly comprises a first prism film, a diffusion film, and a second prism film that are stacked, wherein the first prism film is located between the optical conversion layer and the diffusion film, and wherein the first prism film and the second prism film cooperate with each other to brighten the light.

11. A display screen comprising:
a liquid-crystal display (LCD) panel; and
a backlight system, wherein the backlight system is configured to provide a backlight source for the LCD panel, and wherein the backlight system comprises:
a substrate;
a plurality of spot light sources fastened onto the substrate and configured to emit light;
an optical conversion layer stacked on the substrate, configured to cover the spot light sources and convert the light into a white surface light source, and comprising:
a packaging layer made of a transparent material, wherein the packaging layer is in contact with the substrate and configured to enclose the spot light sources; and
a conversion layer configured to cover a side of the packaging layer that is away from the substrate; and
a light mixing member located on a surface of the optical conversion layer or embedded into the optical conversion layer,
wherein the light mixing member is configured to mix the light.

12. The display screen of claim 11, wherein the light mixing member comprises a plurality of diffusion powders, and wherein the diffusion powders are distributed in the optical conversion layer.

13. The display screen of claim 11, wherein the light mixing member comprises a plurality of membranes, wherein the membranes are configured to transmit a first portion of the light and reflect a second portion of the light, wherein the membranes are embedded into the optical conversion layer or located on a surface of the optical conversion layer that faces away from the substrate, and wherein the membranes are aligned with the spot light sources in a one-to-one correspondence.

14. The display screen of claim 11, wherein the light mixing member comprises a plurality of micro structural blocks, wherein the micro structural blocks are configured to perform optical diffusion on the light, and wherein the micro structural blocks are embedded into the optical conversion layer or located on a surface of the optical conversion layer that faces away from the substrate.

15. The display screen of claim 11, wherein the light mixing member comprises a reflective film located on a surface of the optical conversion layer that faces the substrate, wherein the reflective film is in contact with the substrate, wherein the reflective film is provided with a plurality of hollowed areas, and wherein the spot light sources are located in the hollowed areas in a one-to-one correspondence.

16. A terminal comprising:
a display screen comprising:
a liquid crystal display (LCD) panel; and
a backlight system, wherein the backlight system is configured to provide a backlight source for the LCD panel, and wherein the backlight system comprises:
a substrate;
a plurality of spot light sources fastened onto the substrate and configured to emit light;
an optical conversion layer stacked on the substrate, configured to cover the spot light sources and convert the light into a white surface light source, and comprising
a packaging layer made of a transparent material, wherein the packaging layer is in contact with the substrate and configured to enclose the spot light sources; and
a conversion layer configured to cover a side of the packaging layer that is facing away from the substrate; and
a light mixing member located on a surface of the optical conversion layer or embedded into the optical conversion layer, wherein the light mixing member is configured to mix the light.

17. The terminal of claim 16, wherein the light mixing member comprises a plurality of diffusion powders, and wherein the diffusion powders are distributed in the optical conversion layer.

18. The terminal of claim 16, wherein the light mixing member comprises a plurality of membranes, wherein the membranes are configured to transmit a first portion of the light and reflect a second portion of the light, wherein the membranes are embedded into the optical conversion layer or located on a surface of the optical conversion layer that faces away from the substrate, and wherein the membranes are aligned with the spot light sources in a one-to-one correspondence.

19. The terminal of claim 16, wherein the light mixing member comprises a plurality of micro structural blocks, wherein the micro structural blocks are configured to perform optical diffusion on the light, and wherein the micro structural blocks are embedded into the optical conversion layer or located on a surface of the optical conversion layer that faces away from the substrate.

20. The terminal of claim 16, wherein the light mixing member comprises a reflective film located on a surface of the optical conversion layer that faces the substrate, wherein the reflective film is provided with a plurality of hollowed areas, wherein the reflective film is in contact with the substrate, and wherein the spot light sources are located in the hollowed areas in a one-to-one correspondence.

* * * * *